(12) United States Patent
Diamos et al.

(10) Patent No.: US 11,610,158 B2
(45) Date of Patent: Mar. 21, 2023

(54) AUTOMATED PLACEMENT OF PLANT VARIETIES FOR OPTIMUM PERFORMANCE WITHIN A GROW SPACE SUBJECT TO ENVIRONMENTAL CONDITION VARIABILITY

(71) Applicant: MJNN LLC, South San Francisco, CA (US)

(72) Inventors: Sudnya Diamos, Menlo Park, CA (US); A. Samuel Pottinger, Emeryville, CA (US); Zachary Duncan Swafford, Woodside, CA (US)

(73) Assignee: MJNN LLC, South San Francisco, CA (US)

( * ) Notice: Subject to any disclaimer, the term of this patent is extended or adjusted under 35 U.S.C. 154(b) by 0 days.

(21) Appl. No.: 16/861,984

(22) Filed: Apr. 29, 2020

(65) Prior Publication Data
US 2020/0349476 A1  Nov. 5, 2020

Related U.S. Application Data

(60) Provisional application No. 62/842,034, filed on May 2, 2019.

(51) Int. Cl.
| | | |
|---|---|---|
| *G06Q 10/04* | (2012.01) | |
| *G06Q 10/0631* | (2023.01) | |
| *A01G 9/00* | (2018.01) | |

(52) U.S. Cl.
CPC ....... *G06Q 10/04* (2013.01); *G06Q 10/06313* (2013.01); *A01G 9/00* (2013.01)

(58) Field of Classification Search
CPC .................................................. G06Q 10/04
See application file for complete search history.

(56) References Cited

U.S. PATENT DOCUMENTS

| | | |
|---|---|---|
| 4,015,366 A | 4/1977 | Hall, III |
| RE31,023 E | 9/1982 | Hall, III |
| 4,569,150 A | 2/1986 | Carlson et al. |
| 4,926,585 A | 5/1990 | Dreschel |
| 4,992,942 A | 2/1991 | Bauerle et al. |
| 5,841,883 A | 11/1998 | Kono et al. |
| 6,065,245 A | 5/2000 | Seawright |
| 7,617,057 B2 | 11/2009 | May et al. |

(Continued)

OTHER PUBLICATIONS

"Sklearn.ensemble.AdaBoostClassifier." (http://lijiancheng0614.github.io/scikit-learn/modules/generated/sklearn.ensemble.AdaBoostClassifier.html) 2010-2016; 6 pages.

(Continued)

*Primary Examiner* — Kurtis Gills
(74) *Attorney, Agent, or Firm* — Imanac IP Advisors LLP

(57) ABSTRACT

Systems, methods and computer-readable media are provided for determining optimum placement, within a grow space, of plants of different varieties. Sets of reference environmental setpoints each correspond to a desired predicted performance of a respective plant variety. Environmental condition metrics at different positions within the grow space are determined. An allocation of the plants is determined among different volumetric regions within the grow space based on predicted performance of the plant varieties as a function of position within the grow space.

24 Claims, 14 Drawing Sheets

(56) References Cited

U.S. PATENT DOCUMENTS

| | | | |
|---|---|---|---|
| 7,987,632 B2 | 8/2011 | May et al. | |
| 9,030,549 B2 | 5/2015 | Redden | |
| 9,064,173 B2 | 6/2015 | Redden | |
| 9,095,554 B2 | 8/2015 | Lewis et al. | |
| 9,370,164 B2 | 6/2016 | Lewis et al. | |
| 9,565,812 B2 | 2/2017 | Wilson | |
| 9,642,317 B2 | 5/2017 | Lewis et al. | |
| 9,658,201 B2 | 5/2017 | Redden et al. | |
| 9,717,171 B2 | 8/2017 | Redden et al. | |
| 9,756,771 B2 | 9/2017 | Redden | |
| 9,785,886 B1 | 10/2017 | Andoni et al. | |
| 9,955,552 B2 | 4/2018 | Ashdown et al. | |
| 10,008,035 B1 | 6/2018 | Redden et al. | |
| 10,980,187 B2* | 4/2021 | Conrad | F21S 2/00 |
| 10,990,875 B2* | 4/2021 | Panda | H04L 67/12 |
| 2004/0194371 A1 | 10/2004 | Kinnis | |
| 2008/0148630 A1 | 6/2008 | Ryan et al. | |
| 2009/0199470 A1 | 8/2009 | Capen et al. | |
| 2012/0277117 A1 | 11/2012 | Zayed et al. | |
| 2014/0298511 A1 | 10/2014 | Lewis et al. | |
| 2015/0027040 A1 | 1/2015 | Redden | |
| 2015/0027041 A1 | 1/2015 | Redden | |
| 2015/0027043 A1 | 1/2015 | Redden | |
| 2015/0027044 A1 | 1/2015 | Redden | |
| 2015/0342133 A1* | 12/2015 | Nakajima | A01G 31/02 47/62 R |
| 2015/0366154 A1 | 12/2015 | Lewis et al. | |
| 2016/0000020 A1 | 1/2016 | Sugimoto | |
| 2016/0148104 A1 | 5/2016 | Itzhaky et al. | |
| 2016/0255778 A1 | 9/2016 | Redden et al. | |
| 2017/0039425 A1 | 2/2017 | Itzhaky et al. | |
| 2017/0105358 A1 | 4/2017 | Wilson | |
| 2017/0146226 A1 | 5/2017 | Storey et al. | |
| 2017/0161560 A1 | 6/2017 | Itzhaky et al. | |
| 2017/0202170 A1 | 7/2017 | Lewis et al. | |
| 2017/0206415 A1 | 7/2017 | Redden | |
| 2017/0219711 A1 | 8/2017 | Redden et al. | |
| 2017/0290260 A1 | 10/2017 | Redden et al. | |
| 2017/0332544 A1 | 11/2017 | Conrad et al. | |
| 2018/0014471 A1 | 1/2018 | Jensen et al. | |
| 2018/0014485 A1 | 1/2018 | Whitcher et al. | |
| 2018/0014486 A1 | 1/2018 | Creechley et al. | |
| 2018/0064055 A1 | 3/2018 | Lewis et al. | |
| 2018/0116094 A1 | 5/2018 | Redden | |
| 2018/0132441 A1* | 5/2018 | Harker | A01G 7/045 |
| 2018/0206416 A1 | 7/2018 | Zimmerman et al. | |
| 2019/0259108 A1* | 8/2019 | Bongartz | A01C 21/005 |

OTHER PUBLICATIONS

Hardaker, J.B, The Assignment Technique: Some Agricultural Applications of a Simple Optimizing Procedure, 12 pages.

Nvidia, GPU-Based Deep Learning Inference: A performance and Power Analysis, Nov. 2015, 12 pages.

Dahl et al., GPU-Based Deep Learning Inference: A Performance and Power Analysis, NVidia Whitepaper, Nov. 2015; 12 pages.

Murphy, Kevin. "A Brief Introduction to Reinforcement Learning." A Brief Introduction to Reinforcement Learning, University of British Columbia, 1998, www.cs.ubc.ca/~murphyk/Bayes/pomdp.html; 1 page.

PCT International Search Report and Written Opinion dated Jan. 28, 2020; in patent application No. PCT/US2019/055064, 9 pgs.

Riddle Patricia J., "Genetic Algorithms." Computer Science 760, University of Auckland, 2012, www.cs.auckland.ac.nz/courses/compsci709s2c/lectures/Pat.d/760-GAs.pdf; 54 pages.

Shiffman, Daniel, The Nature of Code; The Magic Book Project, Chapter 10, 2012; 40 pages.

Shiffman, Daniel, The Nature of Code; The Magic Book Project, Chapter 9, 2012; 60 pages.

\* cited by examiner

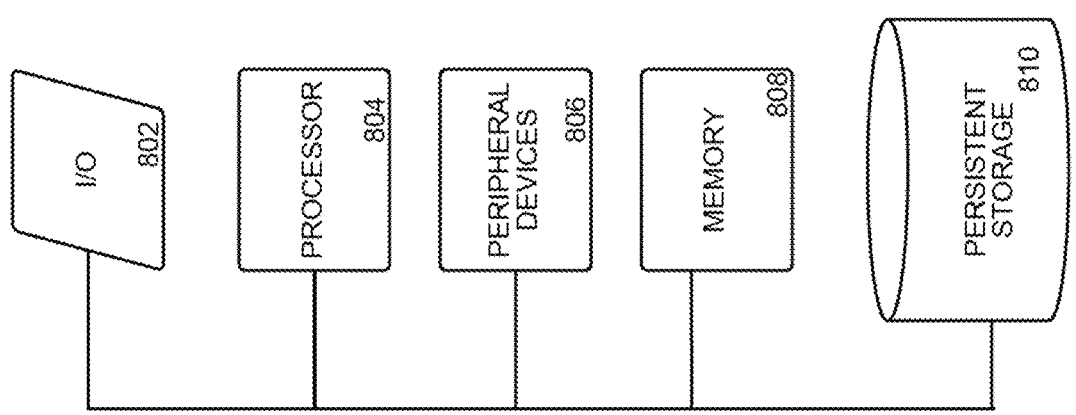

|  | Tower 1 | Tower 2 | Tower 3 | Tower 4 |
|---|---|---|---|---|
| Kale, 1 tower | 90 | 75 | 75 | 80 |
| Arugula, 1 tower | 35 | 85 | 55 | 65 |
| Romaine, 1 tower | 125 | 95 | 90 | 105 |
| Romaine, 2nd tower | 45 | 110 | 95 | 115 |

Step 1 -> subtract lowest value from each entry on that row

|  | Tower 1 | Tower 2 | Tower 3 | Tower 4 |
|---|---|---|---|---|
| Kale, 1 tower | 15 | 0 | 0 | 5 |
| Arugula, 1 tower | 0 | 50 | 20 | 30 |
| Romaine, 1 tower | 35 | 5 | 0 | 15 |
| Romaine, 2nd tower | 0 | 65 | 50 | 70 |

Step 2 -> subtract lowest value from each entry in that column

|  | Tower 1 | Tower 2 | Tower 3 | Tower 4 |
|---|---|---|---|---|
| Kale, 1 tower | 15 | 0 | 0 | 0 |
| Arugula, 1 tower | 0 | 50 | 20 | 25 |
| Romaine, 1 tower | 35 | 5 | 0 | 10 |
| Romaine, 2nd tower | 0 | 65 | 50 | 65 |

Step 3 -> what is the minimum count of {row, columns} that contain the maximum zeros? -> 3

|  | Tower 1 | Tower 2 | Tower 3 | Tower 4 |
|---|---|---|---|---|
| Kale, 1 tower | 15 | 0 | 0 | 0 |
| Arugula, 1 tower | 0 | 50 | 20 | 25 |
| Romaine, 1 tower | 35 | 5 | 0 | 10 |
| Romaine, 2nd tower | 0 | 65 | 50 | 65 |

Step 4 -> is minimum count equal to n (where cost matrix is n x n)?
No
Step 5a -> what is the smallest value not in the masked row, col list?
5
Step 5b: Subtract value from step 5a from entries in row not in the masked row list

|  | Tower 1 | Tower 2 | Tower 3 | Tower 4 |
|---|---|---|---|---|
| Kale, 1 tower | 15 | 0 | 0 | 0 |
| Arugula, 1 tower | -5 | 45 | 15 | 20 |
| Romaine, 1 tower | 30 | 0 | -5 | 5 |
| Romaine, 2nd tower | -5 | 60 | 45 | 60 |

Step 5c: Add value from step 5a to all columns in masked list

|  | Tower 1 | Tower 2 | Tower 3 | Tower 4 |
|---|---|---|---|---|
| Kale, 1 tower | 20 | 0 | 5 | 0 |
| Arugula, 1 tower | 0 | 45 | 20 | 20 |
| Romaine, 1 tower | 35 | 0 | 0 | 5 |
| Romaine, 2nd tower | 0 | 60 | 50 | 60 |

Fig. 13A

Step 3 -> what is the minimum count of {row, columns} that contain the maximum zeros?

|  | Tower 1 | Tower 2 | Tower 3 | Tower 4 |
|---|---|---|---|---|
| Kale, 1 tower | 20 | 0 | 5 | 0 |
| Arugula, 1 tower | 0 | 45 | 20 | 20 |
| Romaine, 1 tower | 35 | 0 | 0 | 5 |
| Romaine, 2nd tower | 0 | 60 | 50 | 60 |

Step 4 -> is minimum count equal to n (were cost matrix is n x n)?
No

Step 5a -> what is the smallest entry not in the masked row, col list?
20

Step 5b: Subtract value from step 5a from entries in row not in the masked row list

|  | Tower 1 | Tower 2 | Tower 3 | Tower 4 |
|---|---|---|---|---|
| Kale, 1 tower | 20 | 0 | 5 | 0 |
| Arugula, 1 tower | -20 | 25 | 0 | 0 |
| Romaine, 1 tower | 35 | 0 | 0 | 5 |
| Romaine, 2nd tower | -20 | 40 | 30 | 40 |

Step 5c: Add value from step 5a to all columns in masked list

|  | Tower 1 | Tower 2 | Tower 3 | Tower 4 |
|---|---|---|---|---|
| Kale, 1 tower | 40 | 0 | 5 | 0 |
| Arugula, 1 tower | 0 | 25 | 0 | 0 |
| Romaine, 1 tower | 55 | 0 | 0 | 5 |
| Romaine, 2nd tower | 0 | 40 | 30 | 40 |

Step 3 -> what is the minimum count of {row, columns} that contain the maximum zeros? -> 4

|  | Tower 1 | Tower 2 | Tower 3 | Tower 4 |
|---|---|---|---|---|
| Kale, 1 tower | 40 | 0 | 5 | 0 |
| Arugula, 1 tower | 0 | 25 | 0 | 0 |
| Romaine, 1 tower | 55 | 0 | 0 | 5 |
| Romaine, 2nd tower | 0 | 40 | 30 | 40 |

Step 4 -> is that equal to n (where cost matrix is n x n)?
Yes, since the minimal number of row, col in masked list is 4, an optimal assignment of zeros is possible.

|  | Tower 1 | Tower 2 | Tower 3 | Tower 4 |
|---|---|---|---|---|
| Kale, 1 tower | 40 | 0 | 5 | 0 |
| Arugula, 1 tower | 0 | 25 | 0 | 0 |
| Romaine, 1 tower | 55 | 0 | 0 | 5 |
| Romaine, 2nd tower | 0 | 40 | 30 | 40 |

Total cost of assignment is 0
Mapping it to the original cost matrix

|  | Tower 1 | Tower 2 | Tower 3 | Tower 4 |
|---|---|---|---|---|
| Kale, 1 tower | 90 | 75 | 75 | 80 |
| Arugula, 1 tower | 35 | 85 | 55 | 65 |
| Romaine, 1 tower | 125 | 95 | 90 | 105 |
| Romaine, 2nd tower | 45 | 110 | 95 | 115 |

Fig. 13B

AUTOMATED PLACEMENT OF PLANT VARIETIES FOR OPTIMUM PERFORMANCE WITHIN A GROW SPACE SUBJECT TO ENVIRONMENTAL CONDITION VARIABILITY

CROSS-REFERENCE TO RELATED APPLICATIONS

This application claims the benefit of priority of U.S. Application No. 62/842,034, filed May 2, 2019. This application is related to U.S. Patent Application Pub. No. 2018/0014486, filed Sep. 28, 2016. Both applications are assigned to the assignee of the present disclosure and incorporated by reference in their entirety herein.

BACKGROUND

Field of the Disclosure

The disclosure relates generally to the field of agriculture, and in particular to placement of plant varieties to optimize plant performance within a grow space subject to environmental condition variability.

Description of the Related Art

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

During the twentieth century, agriculture slowly began to evolve from a conservative industry to a fast-moving high-tech industry in order to keep up with world food shortages, climate change, and societal changes. Farming began to move away from manually-implemented agricultural techniques toward computer-implemented technologies. Conventionally, farmers only have one growing season to produce the crops that would determine their revenue and food production for the entire year. However, this is changing. With indoor growing as an option, and with better access to data processing technologies and other advanced techniques, the science of agriculture has become more agile. It is adapting and learning as new data is collected and insights are generated.

Advancements in technology are making it feasible to control the effects of nature with the advent of "controlled indoor agriculture," otherwise known as "controlled environment agriculture." Improved efficiencies in space utilization and lighting, a better understanding of hydroponics, aeroponics, and crop cycles, and advancements in environmental control systems have allowed humans to better recreate environments conducive for agriculture crop growth with the goals of greater harvest weight yield per square foot, better nutrition and lower cost.

Technical Challenges

Many environmental factors affect the growth of plants. Particular sets of environmental factors perform better or worse against the goal of growing the best plants in the most economical and environmentally friendly way. However, with the refined control of many of the environmental factors that indoor agriculture allows, traditional processes are inadequate to efficiently and effectively determine the most optimal way to grow the desired crops.

For an indoor farm, much effort is expended trying to determine optimum growth conditions for the plants and fine tune the HVAC system to obtain spatially uniform, optimum growth conditions. However, environmental conditions may vary significantly within the grow space in all three dimensions. The placement of HVAC supply and return ducts, lighting, support structures, obstructions, and fans may cause temperature, relative humidity, airflow, and other growth conditions to vary throughout the room. In grow spaces in which plants are disposed in receptacles of vertical grow towers, heat rises, so receptacles at higher elevations will likely be warmer.

In J. B. Hardaker, The Assignment Technique: Some Agricultural Applications of a Simple Optimizing Procedure, *Review of Marketing and Agricultural Economics*, pp. 218-229 (1967), the author provides an example of a farmer planting four different crops in each of four equal sized "paddocks." The paddocks vary in soil fertility and the crops vary in nutrient requirements, so that the costs of the fertilizers which must be applied depend on which crop is grown in which paddock. The objective is to assign paddocks to crops in a manner that minimizes the total fertilizer cost. The paper discusses the "Hungarian method" as a method for solving the assignment problem. However, among other things, the paper does not address controlled environment agriculture, and states that, "Mixed cropping of paddocks is not permitted, nor may the same crop be grown in two paddocks."

SUMMARY OF THE DISCLOSURE

This disclosure employs performance information (e.g., harvest weight) and environmental surveys collected from an indoor farm to enable the automated generation of an operations plan crafted to optimize product metrics. According to embodiments of the disclosure, harvest weights are optimized by allocating a distribution of different plant varieties into positions in any room where there is some spatial representation of the environmental (e.g., temperature) gradient.

In addition to impacting yield, these advances have important implications for engineering and farm operations. Results suggest that having environmental variations within a grow space, intentionally built or not, may actually improve outcomes in comparison to a fully uniform indoor grow space. Also, with minimal adaptation, this methodology could be applied to any position-dependent environmental factors and any outcome factors if the relationship between these factors is well understood on a per-variety basis.

Embodiments of the disclosure provide systems, methods and computer readable media for determining placement, within a grow space, of plants of one or more varieties. The grow space may include a number of receptacle supports each having a number of receptacles. Each receptacle supports a plant. According to embodiments of the disclosure, the process includes:
  a. accessing, by a processor, one or more sets of one or more reference environmental setpoints, wherein each of the one or more sets corresponds to a desired predicted performance of a respective plant variety of the plurality of varieties;

b. accessing, by a processor, environmental condition metrics at different positions within the grow space; and c. determining, by a processor, an allocation of the plants of the one or more plant varieties among different volumetric regions within the grow space based on predicted performance of the one or more plant varieties as a function of position within the grow space.

According to embodiments of the disclosure, determining an allocation comprises allocating the plants among the different volumetric regions to maximize overall predicted performance of the plants.

According to embodiments of the disclosure, the grow space has a controlled agricultural environment. According to embodiments of the disclosure, the one or more plant varieties comprise two or more plant varieties. A region may be a space encompassing one or more of the receptacle supports. According to embodiments of the disclosure, the plurality of receptacle supports comprises a plurality of grow towers. According to embodiments of the disclosure, determining an allocation is based at least in part upon the Hungarian assignment algorithm. According to embodiments of the disclosure, each of the one or more sets of reference environmental setpoints is determined by an optimization algorithm, which may employ machine learning.

According to embodiments of the disclosure, the placement process further includes moving to a first region a first receptacle support supporting first plants of a first plant variety allocated to the first region. According to embodiments of the disclosure, the placement process further includes moving to a first region a first receptacle support supporting first plants of a first plant variety allocated to the first region, wherein the first receptacle support also supports plants of another plant variety. According to embodiments of the disclosure, the placement process further includes moving to a first region first and second receptacle supports that each support first plants of a first plant variety allocated to the first region. According to embodiments of the disclosure, the placement process further includes moving to the first region first plants of the first variety and moving to a second region second plants of the second variety.

According to embodiments of the disclosure, the method further includes, in response to a change in environmental condition metrics, determining a second allocation of the plants of the one or more plant varieties among the different regions based on predicted performance of the one or more plant varieties within the grow space.

According to embodiments of the disclosure, determining an allocation comprises determining an allocation of first plants of a first variety and second plants of a second variety to a first region and a second region, respectively, based on predicted performance of the first and second plant varieties within the grow space.

According to embodiments of the disclosure, the placement process further includes moving from a first region to a third region a first receptacle support supporting first plants of a first plant variety that were allocated to the first region during a first allocation and then reallocated to the third region based upon the second allocation.

According to embodiments of the disclosure, the one or more reference environmental setpoints correspond to at least one of temperature, relative humidity, or air flow. According to embodiments of the disclosure, the predicted performance relates to at least one of growth rate, harvest weight yield, or energy cost. According to embodiments of the disclosure, the environmental condition metrics are based at least in part upon sensor data.

BRIEF DESCRIPTION OF THE DRAWINGS

FIG. 12 illustrates an example of a computer system that may be used to execute instructions stored in a non-transitory computer readable medium (e.g., memory) in accordance with embodiments of the disclosure.

FIGS. 13A-13B illustrate an example of plant variety placement using the Hungarian algorithm, as implemented according to embodiments of the disclosure.

DETAILED DESCRIPTION OF EMBODIMENTS OF THE DISCLOSURE

The present description is made with reference to the accompanying drawings, in which various example embodiments are shown. However, many different example embodiments may be used, and thus the description should not be construed as limited to the example embodiments set forth herein. Rather, these example embodiments are provided so that this disclosure will be thorough and complete. Various modifications to the exemplary embodiments will be readily apparent to those skilled in the art, and the generic principles defined herein may be applied to other embodiments and applications without departing from the spirit and scope of the disclosure. Thus, this disclosure is not intended to be limited to the disclosed embodiments, but is to be accorded the widest scope consistent with the claims and the principles and features disclosed herein.

Exemplary Indoor Agricultural System

The following describes a vertical farm production system configured for high density growth and crop yield. Although embodiments of the disclosure will primarily be described in the context of a vertical farm in which plants are grown in towers, those skilled in the art will recognize that the principles described herein are not limited to a vertical farm or the use of grow towers, but rather apply to plants grown in any structural arrangement.

Figure 1:
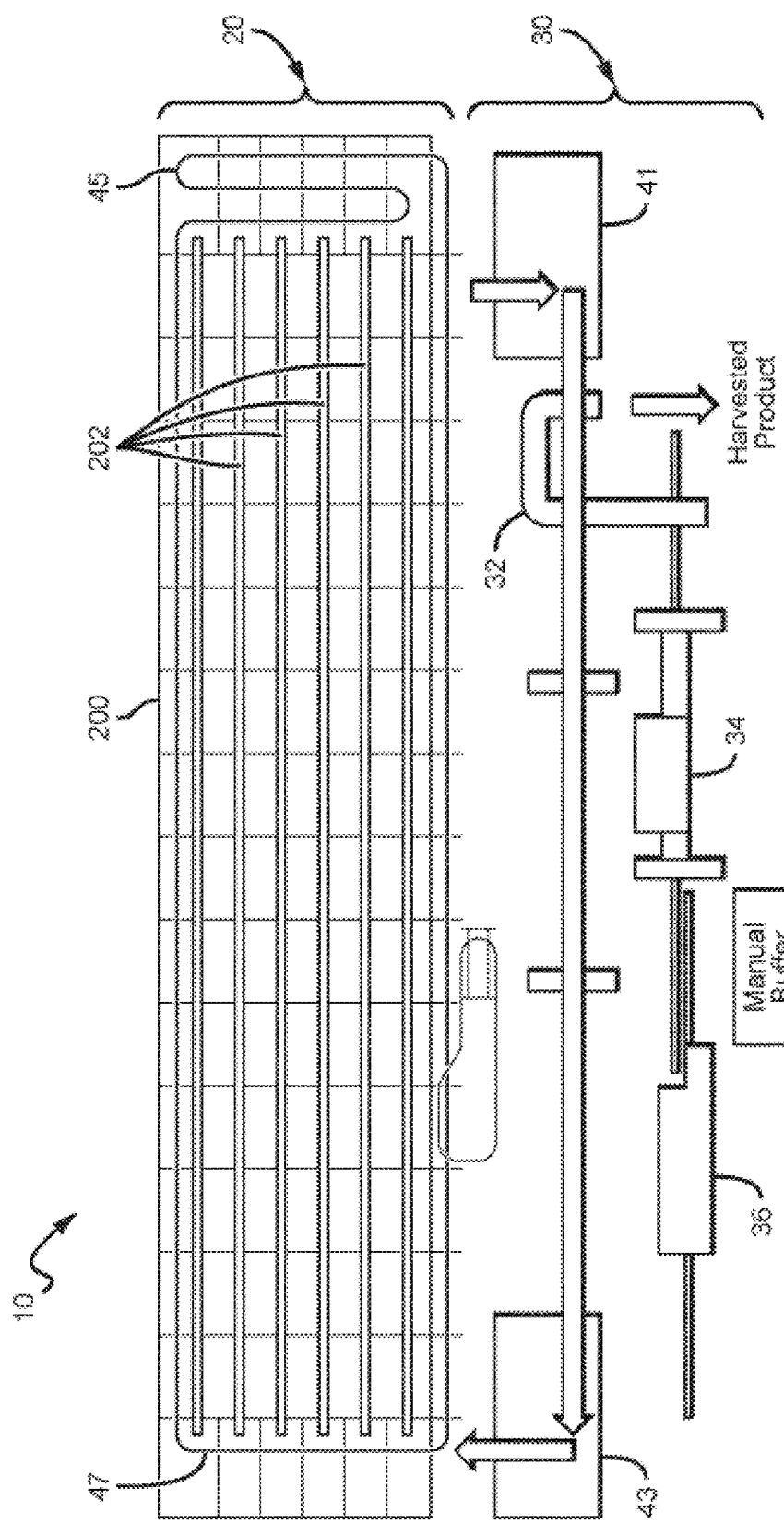
FIGS. 1 and 2 illustrate a controlled environment agriculture system, according to embodiments of the disclosure.
Figure 2:
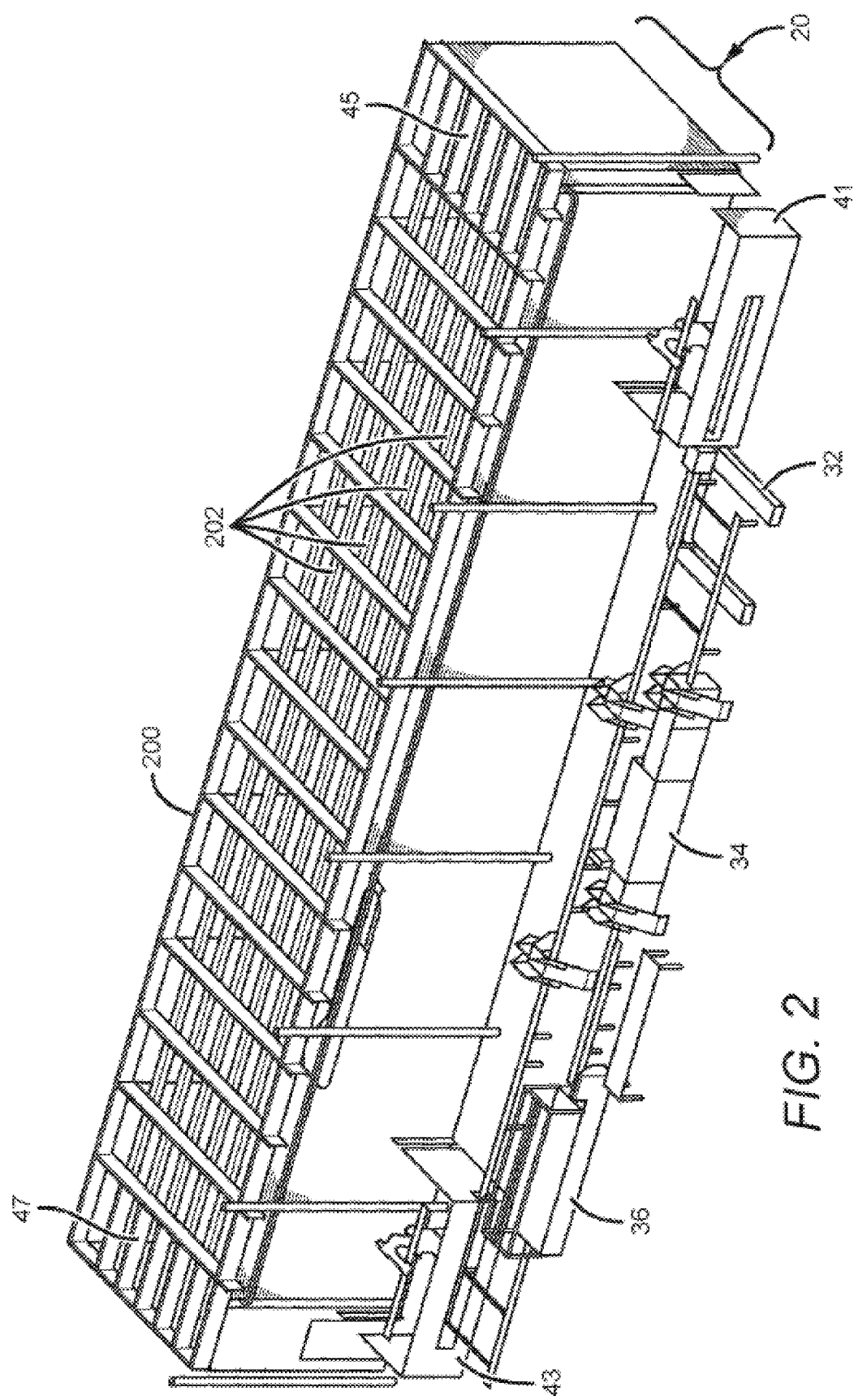

FIGS. 1 and 2 illustrate a controlled environment agriculture system 10, according to embodiments of the disclosure. At a high level, the system 10 may include an environmentally-controlled growing chamber 20, a vertical tower conveyance system 200 that is disposed within the growing chamber 20 and configured to convey vertical grow towers with crops disposed therein, and a central processing facility 30. The plant varieties that may be grown may be gravitropic/geotropic, phototropic, hydroponic, or some combination thereof. The varieties may vary considerably and include various leaf vegetables, fruiting vegetables, flowering crops, fruits, and the like. The controlled environment agriculture system 10 may be configured to grow a single crop type at a time or to grow multiple crop types concurrently.

The system 10 may also include conveyance systems for moving the grow towers in a circuit throughout the crop's growth cycle, the circuit comprising a staging area configured to load the grow towers into and out of the vertical tower conveyance mechanism 200. The central processing system 30 may include one or more conveyance mechanisms for directing grow towers to stations in the central processing system 30, e.g., stations for loading plants into, and harvesting crops from, the grow towers. The vertical tower conveyance system 200 is configured to support and translate one or more grow towers 50 along grow lines 202. According to embodiments of the disclosure, the grow towers 50 hang from the grow lines 202.

Each grow tower 50 is configured to contain plant growth media that supports a root structure of at least one crop plant growing therein. Each grow tower 50 is also configured to releasably attach to a grow line 202 in a vertical orientation and move along the grow line 202 during a growth phase. Together, the vertical tower conveyance mechanism 200 and the central processing system 30 (including associated conveyance mechanisms) can be arranged in a production circuit under control of one or more computing systems.

Figure 3:
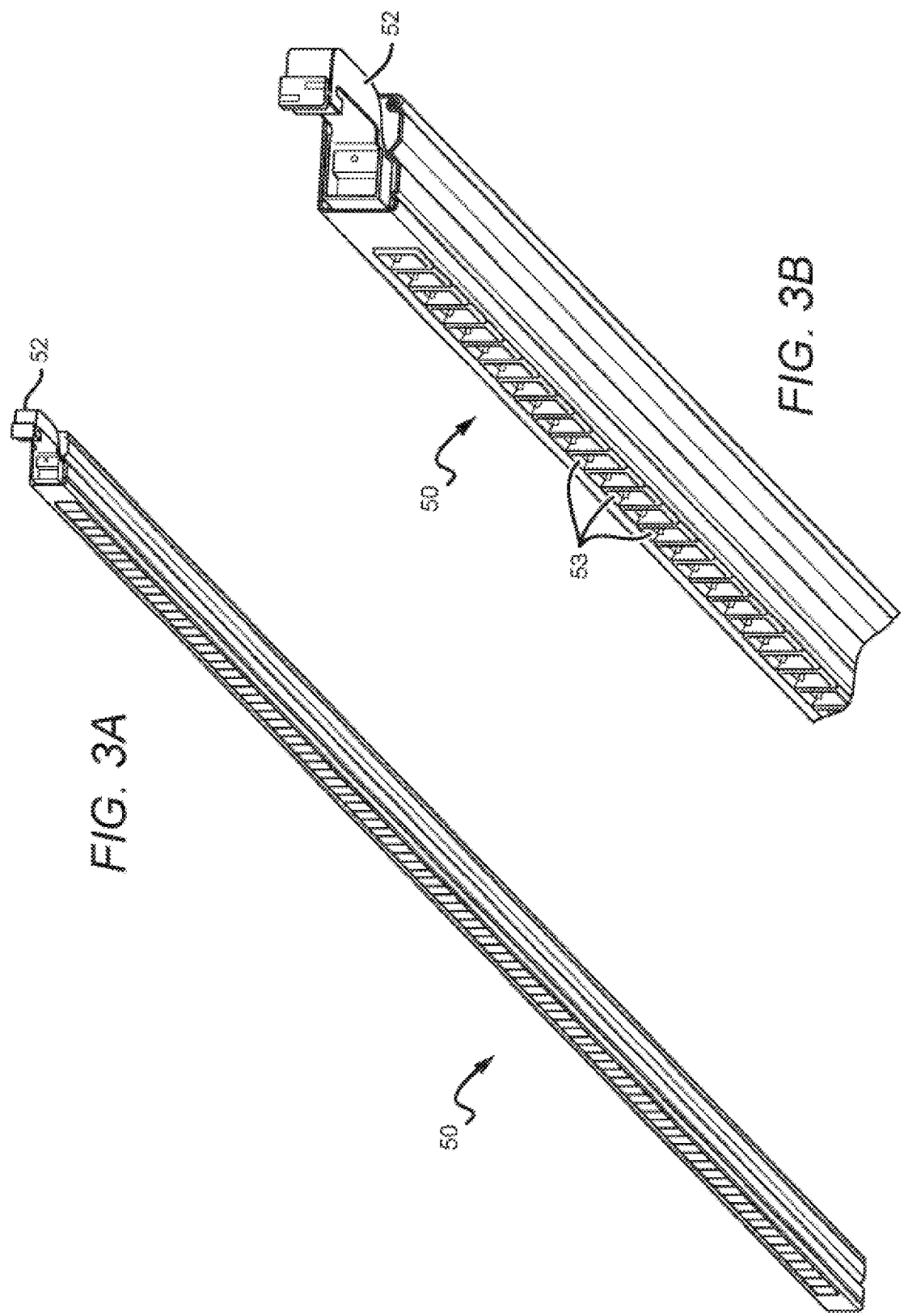
FIGS. 3A and 3B illustrate a grow tower, according to embodiments of the disclosure.

Grow towers 50 provide the sites for individual crops to grow in the system. As FIGS. 3A and 3B illustrate, a tower 50 includes a hook 52 at the top. Hook 52 allows grow tower 50 to be supported by a grow line 202 when it is inserted into the vertical tower conveyance system 200. In one implementation, a grow tower 50 measures 5.172 meters long, where the extruded length of the tower is 5.0 meters, and the hook is 0.172 meters long. The extruded rectangular profile of the grow tower 50, in one implementation, measures 57 mm×93 mm (2.25"×3.67"). The hook 52 can be designed such that its exterior overall dimensions are not greater than the extruded profile of the grow tower 50.

Grow towers 50 may include a set of grow sites 53 arrayed along at least one face of the grow tower 50. In the implementation shown in FIG. 4A, grow towers 50 include grow sites 53 on opposing faces such that plants protrude from opposing sides of the grow tower 50. Transplanter station 36 may transplant seedlings into empty grow sites 53 of grow towers 50, where they remain in place until they are fully mature and ready to be harvested. In one implementation, the orientation of the grow sites 53 are perpendicular to the direction of travel of the grow towers 50 along grow line 202. In other words, when a grow tower 50 is inserted into a grow line 202, plants extend from opposing faces of the grow tower 50, where the opposing faces are parallel to the direction of travel. Although a dual-sided configuration is preferred, the invention may also be utilized in a single-sided configuration where plants grow along a single face of a grow tower 50.

Figure 4:
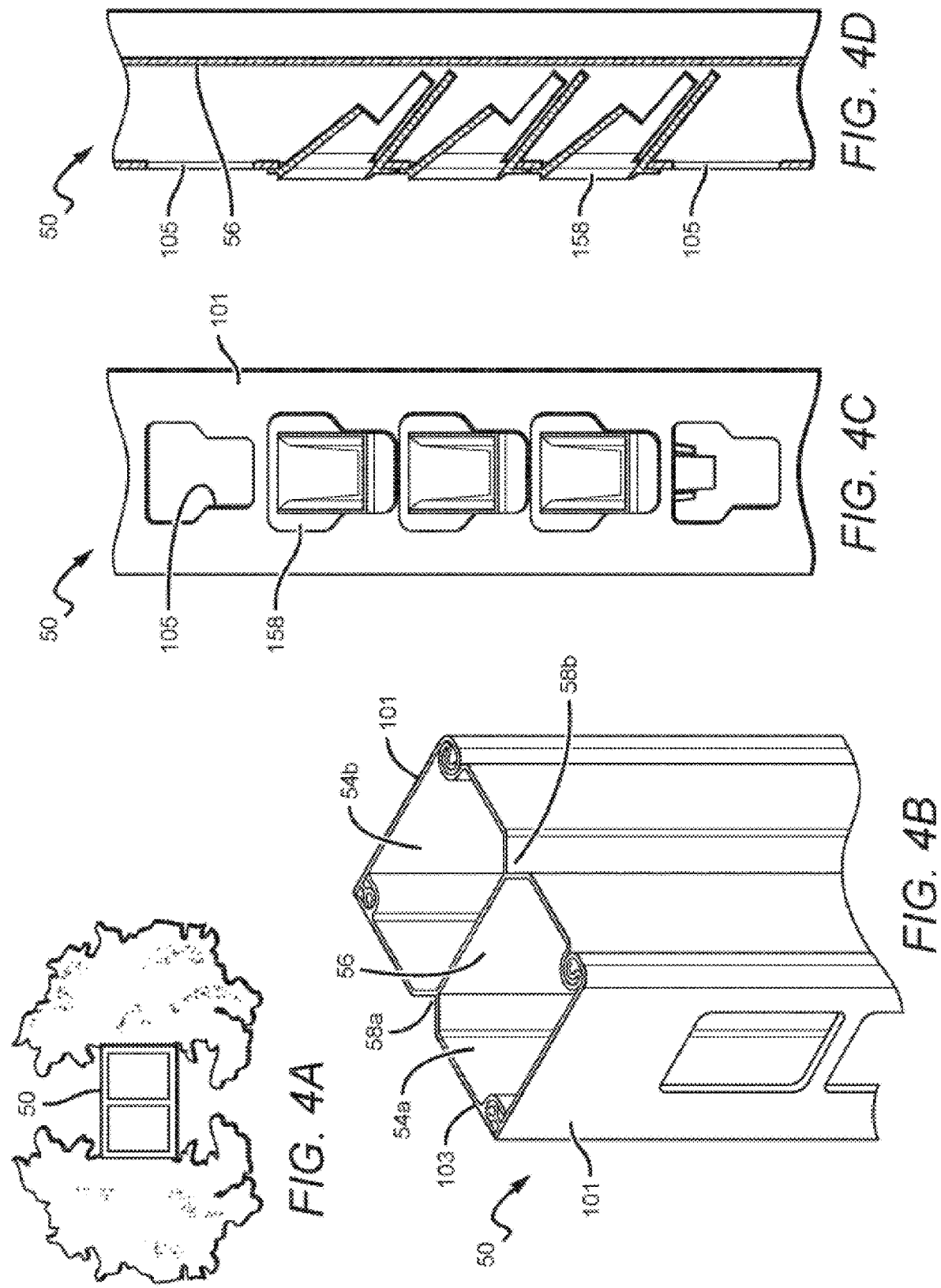
FIG. 4A is an end view of a grow tower having grow sites on opposing faces, according to embodiments of the disclosure.
FIG. 4B is a perspective view of a dual-sided grow tower, according to embodiments of the disclosure.
FIGS. 4C and 4D is a front view and a side cross-sectional view of a grow tower having a plurality of receptacles for supporting plants.

Grow towers 50 may each consist of three extrusions which snap together to form one structure. As shown, the grow tower 50 may be a dual-sided hydroponic tower, where the tower body 103 includes a central wall 56 that defines a first tower cavity 54a and a second tower cavity 54b. FIG. 4B provides a perspective view of an exemplary dual-sided, multi-piece hydroponic grow tower 50 in which each front face plate 101 is hingeably coupled to the tower body 103. In FIG. 4B, each front face plate 101 is in the closed position. The cross-section of the tower cavities 54a, 54b may be in the range of 1.5 inches by 1.5 inches to 3 inches by 3 inches, where the term "tower cavity" refers to the region within the body of the tower and behind the tower face plate. The wall thickness of the grow towers 50 maybe within the range of 0.065 to 0.075 inches. A dual-sided hydroponic tower, such as that shown in FIGS. 4A and 4B, has two back-to-back cavities 54a and 54b, each preferably within the noted size range. In the configuration shown, the grow tower 50 may include (i) a first V-shaped groove 58a running along the length of a first side of the tower body 103, where the first V-shaped groove is centered between the first tower cavity and the second tower cavity; and (ii) a second Vshaped groove 58b running along the length of a second side of the tower body 103, where the second V-shaped groove is centered between the first tower cavity and the second tower cavity. The V-shaped grooves 58a, 58b may facilitate registration, alignment and/or feeding of the towers 50 by one or more of the stations in central processing system 30. Another attribute of V-shaped grooves 58a, 58b is that they effectively narrow the central wall 56 to promote the flow of aqueous nutrient solution centrally where the plant's roots are located.

As FIGS. 4C and 4D illustrate, grow towers 50 may each include a plurality of receptacles 105, for example cut-outs 105 as shown, for use with a compatible growth module 158, such as a plug holder. Each plug holder holds a plant of a given variety. Plug holder 158 may be ultrasonically welded, bonded, or otherwise attached to tower face 101. As shown, the growth modules 158 may be oriented at a 45-degree angle relative to the front face plate 101 and the vertical axis of the grow tower 50. It should be understood, however, that tower design disclosed in the present application is not limited to use with a particular plug holder or orientation, rather, the towers disclosed herein may be used with any suitably sized and/or oriented growth module. As such, cut-outs 105 are only meant to illustrate, not limit, the present tower design and it should be understood that embodiments may employ towers with other receptacle designs. In particular, receptacle supports other than towers may be used to support plants. In general, the receptacles may be part of any receptacle support structure for supporting plants within the grow space. For example, the receptacles may be laid out in rows and columns in a horizontal plane. The receptacle support may comprise a member (e.g., a tray, a table, an arm) holding multiple receptacles in a longitudinal (e.g., row) direction. The receptacles may be conveyed during their growth cycle in the longitudinal direction.

The growth environment 20 may include light emitting sources positioned at various locations between and along the grow lines 202 of the vertical tower conveyance system 200. The light emitting sources can be positioned laterally relative to the grow towers 50 in the grow line 202 and configured to emit light toward the lateral faces of the grow towers 50, which include openings from which crops grow. The light emitting sources may be incorporated into a water-cooled, LED lighting system as described in U.S. Publication No. 2017/0146226A1, the disclosure of which is incorporated by reference in its entirety herein. In such an embodiment, the LED lights may be arranged in a bar-like structure. The bar-like structure may be placed in a vertical orientation to emit light laterally to substantially the entire length of adjacent grow towers 50. Multiple light bar structures may be arranged in the growth environment 20 along and between the grow lines 202. Other lighting systems and configurations may be employed. For example, the light bars may be arranged horizontally between grow lines 202.

The growth environment 20 may also include a nutrient supply system configured to supply an aqueous crop nutrient solution to the crops as they translate through the growth chamber 20. The nutrient supply system may apply aqueous crop nutrient solution to the top of the grow towers 50. Gravity may cause the solution travel down the vertically-oriented grow tower 50 and through the length thereof to supply solution to the crops disposed along the length of the grow tower 50. The growth environment 20 may also include an airflow source that is configured to, when a tower is mounted to a grow line 202, direct airflow in the lateral growth direction of growth and through an under-canopy of the growing plant, so as to disturb the boundary layer of the under-canopy of the growing plant. In other implementations, airflow may come from the top of the canopy or orthogonal to the direction of plant growth. The growth environment 20 may also include a control system, and associated sensors, for regulating at least one growing condition, such as air temperature, airflow speed, relative air humidity, and ambient carbon dioxide gas content. The control system may for example include such sub-systems as HVAC units, chillers, fans and associated ducting and air handling equipment. Grow towers 50 may have identifying attributes (such as bar codes or RFID tags). The controlled environment agriculture system 10 may include corresponding sensors and programming logic for tracking the grow towers 50 during various stages of the farm production cycle or for controlling one or more conditions of the growth environment. The operation of control system and the length of time towers remain in the growth environment can vary considerably depending on a variety of factors, such as crop type and other factors.

The grow towers 50 with newly transplanted crops or seedlings are transferred from the central processing system 30 into the vertical tower conveyance system 200. Vertical tower conveyance system 200 moves the grow towers 50 along respective grow lines 202 in growth environment 20 in a controlled fashion. Crops disposed in grow towers 50 are exposed to the controlled conditions of the growth environment (e.g., light, temperature, humidity, air flow, aqueous nutrient supply, etc.). The control system is capable of automated adjustments to optimize growing conditions within the growth chamber 20 and make continuous improvements to various attributes, such as crop yields, visual appeal and nutrient content. In addition, US Patent Publication Nos. 2018/0014485 and 2018/0014486, incorporated by reference herein, describe application of machine learning and other operations to optimize grow conditions in a vertical farming system. In some implementations, environmental condition sensors may be disposed on grow towers 50 or at various locations in the growth environment 20. When crops are ready for harvesting, grow towers 50 with crops to be harvested are transferred from the vertical tower conveyance system 200 to the central processing system 30 for harvesting and other processing operations.

Central processing system 30 may include processing stations directed to injecting seedlings into towers 50, harvesting crops from towers 50, and cleaning towers 50 that have been harvested. Central processing system 30 may also include conveyance mechanisms that move towers 50 between such processing stations. For example, as FIG. 1 illustrates, central processing system 30 may include harvester station 32, washing station 34, and transplanter station 36. Harvester station 32 may deposit harvested crops into food-safe containers and may include a conveyance mechanism for conveying the containers to post-harvesting facilities (e.g., preparation, washing, packaging and storage) that are beyond the scope of this disclosure.

Controlled environment agriculture system 10 may also include one or more conveyance mechanisms for transferring grow towers 50 between growth environment 20 and central processing system 30. In the implementation shown, the stations of central processing system 30 operate on grow towers 50 in a horizontal orientation. In one implementation, an automated pickup (loading) station 43, and associated control logic, may be operative to releasably grasp a horizontal tower from a loading location, rotate the tower to a vertical orientation and attach the tower to a transfer station for insertion into a selected grow line 202 of the growth environment 20. On the other end of growth environment 20, automated laydown (unloading) station 41, and associated control logic, may be operative to releasably grasp and move a vertically oriented grow tower 50 from a buffer location, rotate the grow tower 50 to a horizontal orientation and place it on a conveyance system for loading into harvester station 32. In some implementations, if a grow tower 50 is rejected due to quality control concerns, the conveyance system may bypass the harvester station 32 and carry the grow tower to washing station 34 (or some other station). The automated laydown and pickup stations 41 and 43 may each comprise a six-degrees of freedom robotic arm 1502, such as a FANUC robot. The stations 41 and 43 may also include end effectors for releasably grasping grow towers 50 at opposing ends.

Growth environment 20 may also include automated loading and unloading mechanisms for inserting grow towers 50 into selected grow lines 202 and unloading grow towers 50 from the grow lines 202. According to embodiments of the disclosure, a load transfer conveyance mechanism 47 may include a powered and free conveyor system that conveys carriages each loaded with a grow tower 50 from the automated pickup station 43 to a selected grow line 202. Vertical grow tower conveyance system 200 may include sensors (such as RFID or bar code sensors) to identify a given grow tower 50 and, under control logic, select a grow line 202 for the grow tower 50. The load transfer conveyance mechanism 47 may also include one or more linear actuators that pushes the grow tower 50 onto a grow line 202. Similarly, the unload transfer conveyance mechanism 45 may include one or more linear actuators that push or pull grow towers from a grow line 202 onto a carriage of another powered and free conveyor mechanism, which conveys the carriages 1202 from the grow line 202 to the automated laydown station 41.

Figure 5:
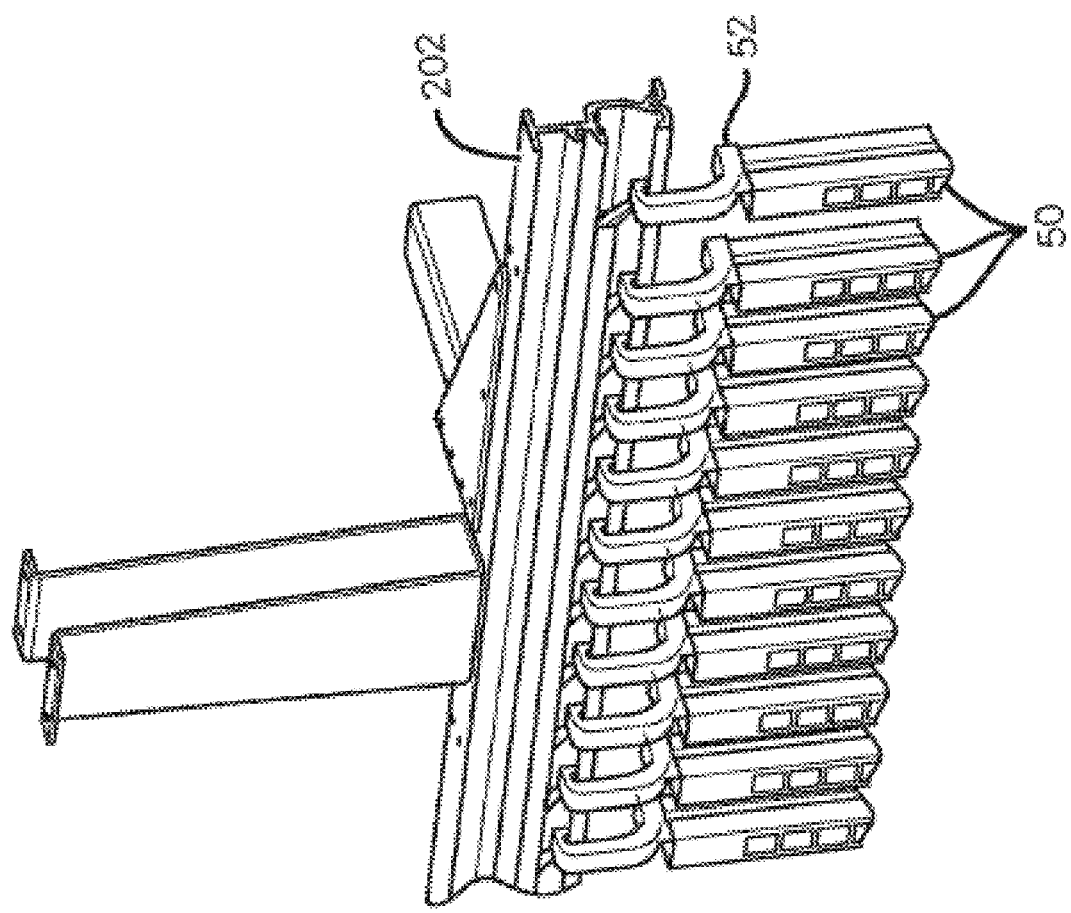
FIG. 5 illustrates a portion of a grow line in a vertical tower conveyance system, according to embodiments of the disclosure.

FIG. 5 illustrates a portion of a grow line 202 in the vertical tower conveyance system 200. According to embodiments of the disclosure, the vertical tower conveyance system 200 includes grow lines 202 arranged in parallel. As discussed elsewhere herein, automated loading and unloading mechanisms 45, 47 may selectively load and unload grow towers 50 from a grow line 202 under automated control systems. As FIG. 5 shows, each grow line 202 supports a plurality of grow towers 50. In one implementation, a grow line 202 may be mounted to the ceiling (or other support) of the grow structure by a bracket for support purposes. Hook 52 hooks into, and attaches, a grow tower 50 to a grow line 202, thereby supporting the tower in a vertical orientation as it is translated through the vertical tower conveyance system 200. A conveyance mechanism moves towers 50 attached to respective grow lines 202.

Figure 6:
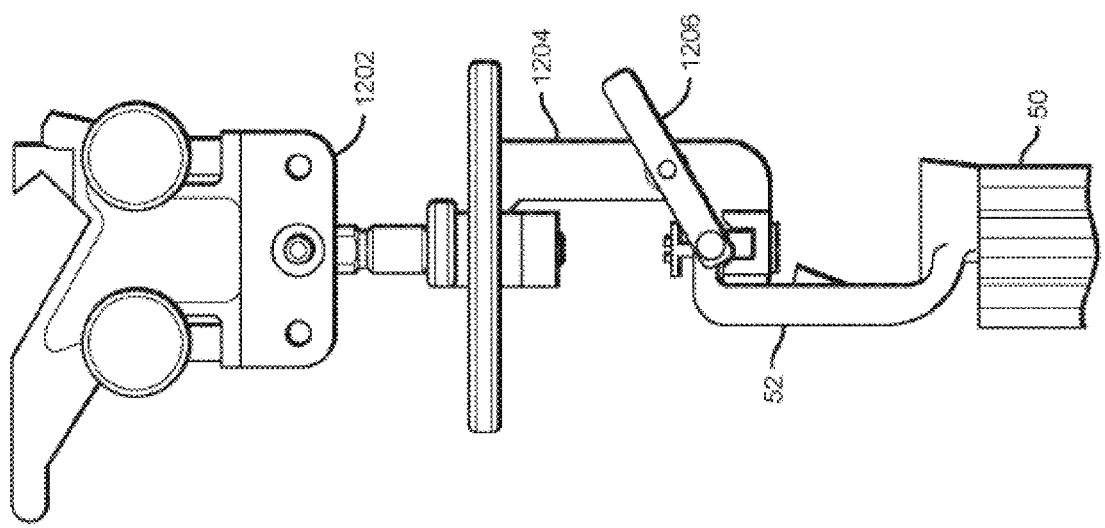
FIG. 6 illustrates a carriage that may be used in a conveyor mechanism, according to embodiments of the disclosure.

FIG. 6 illustrates a carriage 1202 that may be used in a powered and free conveyor mechanism. In the implementation shown, carriage 1202 includes hook 1204 that engages hook 52 of grow tower 50. A latch assembly 1206 may secure the grow tower 50 while it is being conveyed to and from locations in the system. In one implementation, one or both of load transfer conveyance mechanism 47 and unload transfer conveyance mechanism 45 may be configured with a sufficient track distance to establish a zone where grow towers 50 may be buffered. For example, unload transfer conveyance mechanism 45 may be controlled such that it unloads a set of towers 50 to be harvested unto carriages 1202 that are moved to a buffer region of the track. On the other end, automated pickup station 43 may load a set of towers to be inserted into growth environment 20 onto carriages 1202 disposed in a buffer region of the track associated with load transfer conveyance mechanism 47.

Figure 7:
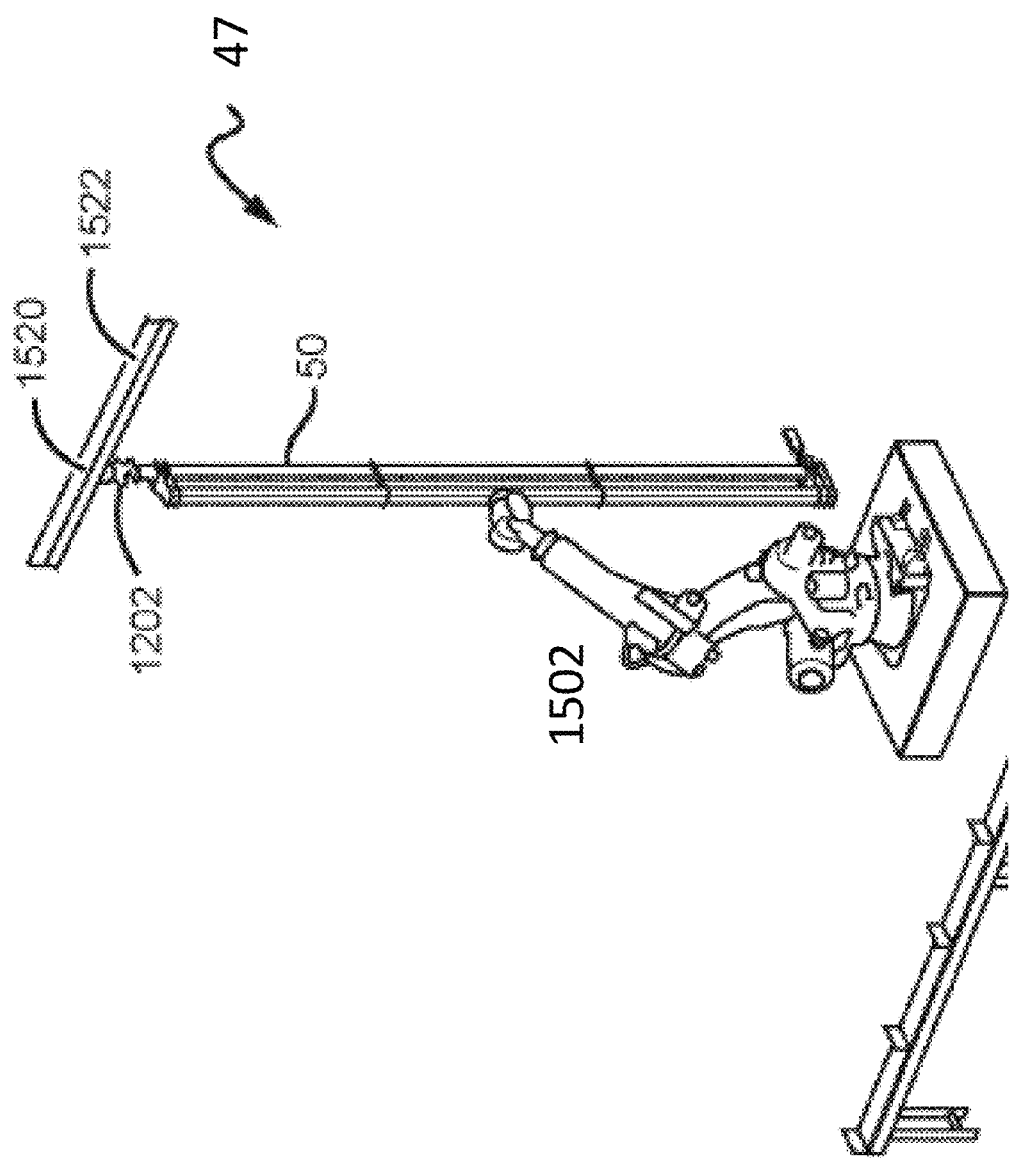
FIG. 7 illustrates a robot arm according to embodiments of the disclosure.

FIG. 7 illustrates a robot 1502 according to embodiments of the disclosure. The robot 1502 includes an end effector for releasably grasping grow towers 50. According to embodiments of the disclosure, the robot 1502 may grasp a grow tower 50 and lift it off of carriage 1202 of loading transfer conveyance mechanism 47. In one implementation, a buffer track section 1522 of loading transfer conveyance mechanism 47 allows mechanism 47 to convey grow towers 50 attached to carriages 1202 into growth environment 20 from stop location 1520. Loading transfer conveyance mechanism 47 may use a controlled stop blade to stop the carriage 1202 at the stop location 1520.

Figure 8:
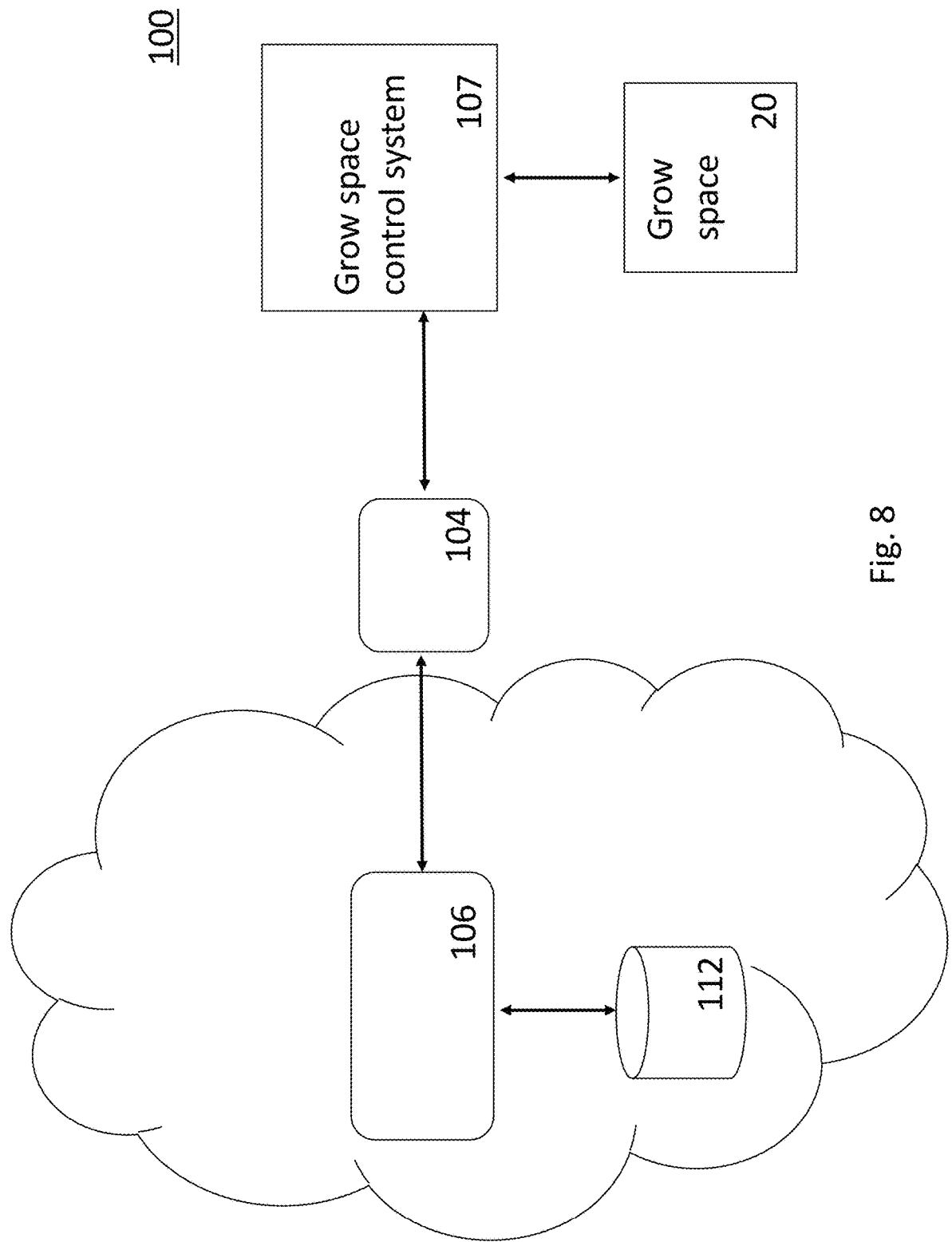
FIG. 8 illustrates a system for optimally allocating the placement of plants within an agricultural grow space, according to embodiments of the disclosure.

Spatial Allocation of Plant Varieties as Function of Pico-climates in Grow Space FIG. 8 illustrates a system 100 for optimally allocating the placement of plants within the agricultural grow space 20, according to embodiments of the disclosure. The system includes a grow space control system 107, an interface 104, and an allocation engine 106 that communicates with a database 112. The engine 106 and the database 112 may reside in a network cloud in relation to interface 104.

Figure 9:
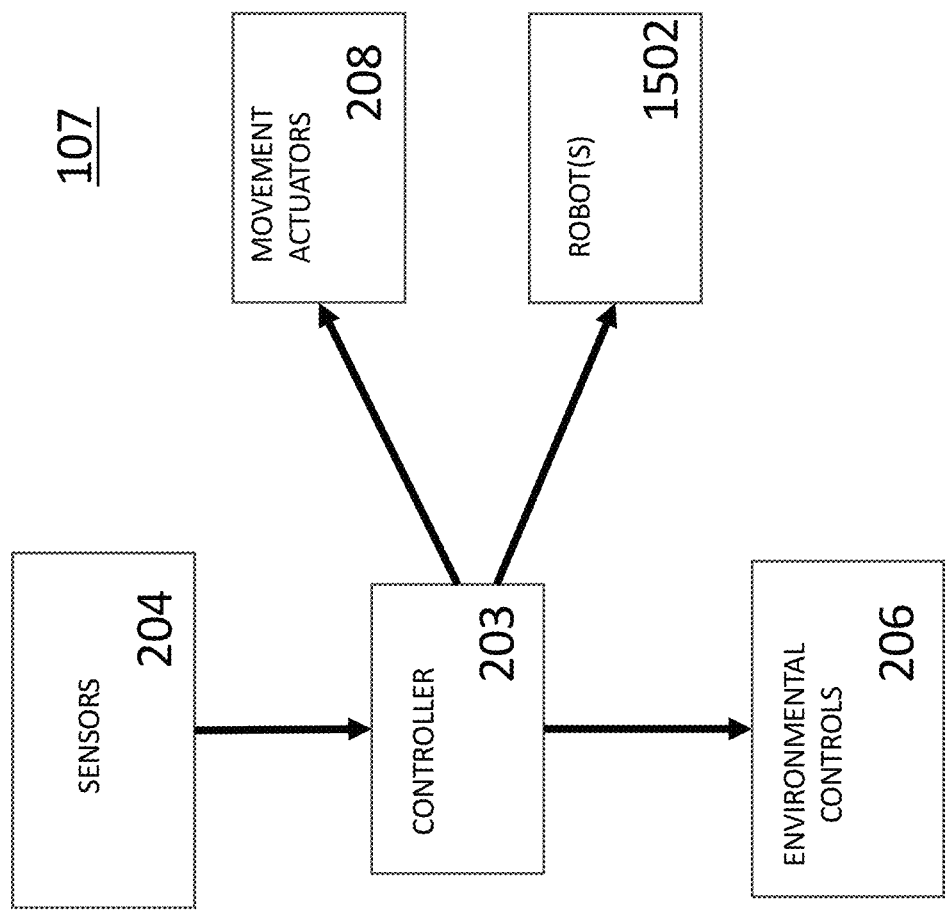
FIG. 9 is a diagram of a grow space control system for measuring environmental conditions in the grow space, and controlling placement of plants within the grow space, according to embodiments of the disclosure.

FIG. 9 is a simplified diagram of the grow space control system 107 for measuring environmental conditions in the grow space 20 and controlling placement of plants within the grow space 20, according to embodiments of the disclosure. According to embodiments of the disclosure, each vertical tower 50 supports a variety of interest, and control system 107 controls movement of plants within a tower 50, as well as movement of the vertical towers 50. The control system 107 includes a controller 203, sensors 204, environmental controls 206, movement actuators 208, and one or more robots 1502.

According to embodiments of the disclosure, the movement actuators 208 control the movement of the plants within the towers 50. For example, the actuators 208 may increase spacing between the plants along the length of a tower 50 to provide more inter-plant space as the plant canopies grow. According to embodiments of the disclosure, the controller 203 controls positioning of the towers 50 within the grow space 20 by, for example, instructing robot(s) 1502 to unload and load the towers 50 from and on to grow lines 202. The controller 203 may be implemented using programmed logic, such as a computer, a microcontroller, or an ASIC. The sensors 204 may include sensors that sense environmental conditions such as temperature; humidity; air flow; $CO_2$; water flow; pH, EC, DO, and nutrient levels of irrigation water; and light intensity, spectrum, and schedule.

Figure 10:
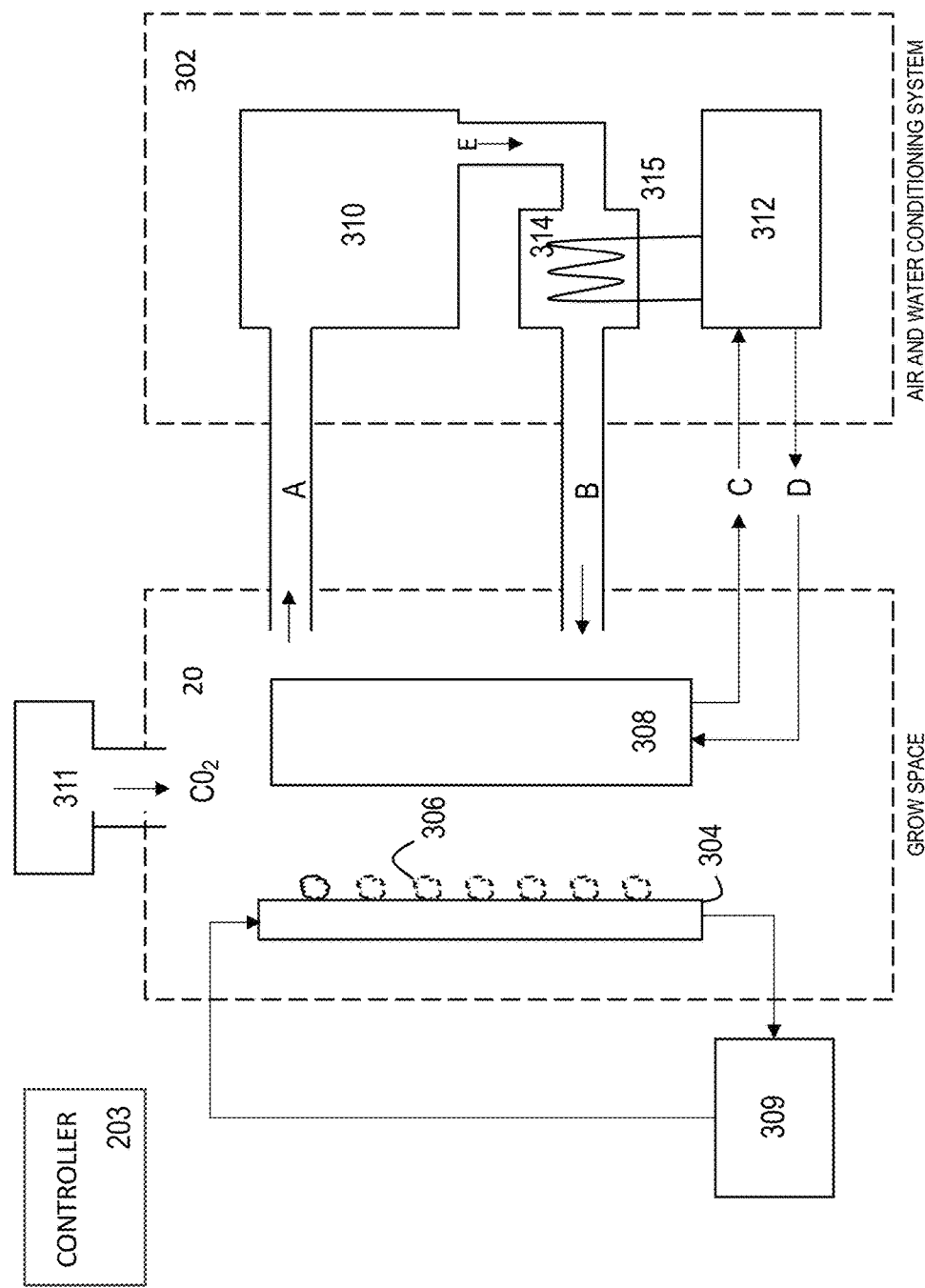
FIG. 10 illustrates a grow space and an environmental conditioning system for conditioning air and fluid in the grow space, according to embodiments of the disclosure.

FIG. 10 illustrates a plant growing environment 20 and an environmental conditioning system 302 for conditioning air and fluid (e.g., water) in the grow space 20, according to embodiments of the disclosure. The plant growing environment 20 includes at least one receptacle support structure 304 (such as a tower 50) having receptacles for holding plants 306, and a fluid-cooled light fixture 308, according to embodiments of the disclosure.

An irrigation pump 309 circulates water and nutrients through the plant support structure 304. Carbon dioxide supply equipment 311 provides carbon dioxide to the plants. The irrigation pump 309 and carbon dioxide supply equipment 311 may be considered as part of the conditioning system 302, according to embodiments of the disclosure.

According to embodiments of the disclosure, the conditioning system 302 includes a dehumidifier 310, a fluid (e.g., water) conditioning system 312, and a heating coil 314 in heat exchanger 315. The dehumidifier 310 receives return air A from the grow space 101. The conditioning system 302 provides supply air B, having a temperature and relative humidity that is controlled to meet setpoints for desired operating conditions of the plants in the environment 20.

The fluid conditioning system 312 receives return fluid C from the fluid-cooled light fixture 308. According to embodiments of the disclosures, the fluid conditioning system 312 can control the fluid temperature by varying the fluid flow rate through the light fixtures 308. The fluid conditioning system 312 supplies to the fluid-cooled light fixture 308 a supply fluid D, having a temperature that is controlled to meet set points for desired operating conditions of the plants in the environment 20.

According to embodiments of the disclosure, waste heat from the fluid passing through fluid conditioning system 312 may be provided to the heating coil 314 in the heat exchanger 315 to heat air E that is output from the dehumidifier 310. The air heated by the coil 314 is output as heated air B to the grow space 20.

The controller 203 may control all the elements of the conditioning system 302, according to embodiments of the disclosure. The controller 203 may receive sensed parameters from sensors distributed throughout the plant growing environment 101 and the air and water conditioning system 302, according to embodiments of the disclosure. Such sensors may include, for example, sensors that measure temperature, humidity, soil moisture, plant characteristics (e.g., size, shape, color), and irrigation flow rate. The controller 203 may use the sensed parameters as feedback to instruct the conditioning system 302 to control environmental treatments (e.g., temperature, humidity) of the plant growing environment 101, according to embodiments of the disclosure.

Harvest Weight and Growth Variables

The vertical-tower grow space 20 was analyzed to assess any relationship between plant location and harvest weights. It was established that grow conditions are not uniform in the space, so different towers 50 experienced different environments, referred to herein as "picoclimates."

Response Variable

While harvest weights are not the only output of interest, they offer a convenient response variable to use in evaluating designs retrospectively as they provide one measure of possible salable product. With that in mind, harvest weights are only comparable within a single variety. Consider that a tower 50 of kale in the "best" possible environment may have a different yield weight than a tower 50 of baby greens in a corresponding ideal environment. Arugula is usually lighter than kale. If one were to optimize for raw harvest weights, it would favor kale simply because it weighs more. So, a 10 lb. harvest of kale does not necessarily "perform better" than a 9 lb. harvest of baby arugula from the same number of towers. Ideally, to obtain comparable performance, the weights would be normalized on a per-variety basis.

The z score is a common transformation used in statistics and, for a data point, is calculated by subtracting the mean for the distribution from the data point and then dividing by the standard deviation. This effectively centers and scales distributions without changing their shape. According to embodiments of the disclosure, the engine 106 therefore converts harvest weights to z scores so that total z score can be maximized instead of total harvest weight. The algorithm seeks to push all plants to the maximum expected weights for their varieties.

Experiments

A number of hypotheses were tested. The experiments found significant relationships between varietal harvest weight rank and: (1) vertical temperature rank on the tower, (2) row in the room, and (3) temperature rank in the room. The experiments were run for 44 tower positions in 21 rows (grow lines), providing a total of 21*44=924 unique positions. Harvest weights were compared for random placement vs. the Hungarian algorithm of embodiments of the disclosure.

In the dataset given, plant capsules (i.e., plug holders) from three receptacles were examined per a number of towers. To be clear, six varieties were reported in the harvest data with, on average, two towers harvested each. In response to these small sample sizes, this study employed methods of pooling varieties to ensure sufficient power.

Consider the example of determining whether vertical position on a tower is related to harvest weights. Unnormalized weights cannot be compared across varieties, so only one variety can be considered at a time if weights themselves are used as the response variable. This yields only 15 observations for some varieties like salanova over the full harvest. However, while harvest weights of different varieties like kale and salanova cannot be directly compared, the position of highest yield on a tower may be comparable across towers despite variety. This shifts the question from "does position correlate with harvest weight?", which is variety-dependent, to "do the best harvest weights come from a particular tower position?" despite variety-specific weight characteristics.

Therefore, the experimenters ranked the independent and dependent variable observations from highest to lowest and attempted to make statements about those two sets of ranks as opposed to the values themselves. Of course, since ranks can be compared across varieties, this study could pool observations across different types of plants, saving the analysis from using very small samples.

Thus, for hypothesis testing, in the dataset there were three harvest weights provided per tower, which come from three positions (highest, mid, or lowest). Also, as described above, all varieties are pooled via the aforementioned rank transformation.

After experimentation, the following hypotheses were accepted.

Hypothesis 1: Vertical Temperature Rank on the Tower is Related to Tower Weight Rankings Rationale: Earlier work demonstrated that the vertical temperature gradient is not consistent across the room and, for some towers, the highest temperature is at the top of the tower but for others it was observed in the middle or bottom positions. So, this hypothesis sought to understand if there was relationship between the location of the highest, mid, and lowest temperature on a tower and the locations of the highest, mid, and lowest recorded harvests of that tower.

Method: Possible ordinal values were observed for temperature and position. These were treated as nominal and evaluated again via a Chi-squared test and the strength of the relationship was then evaluated via a Cramer's V test if it was found to be significant.

How to Read: In the contingency table, Table 1, below, six of the capsules harvested from their towers' lowest temperature also had the lowest yield, and 18 had the highest yield. Meanwhile, 20 of the capsules harvested from the highest temperature had the lowest yield.

Findings: The relationship between yield ranking and temperature ranking per tower was found to be significant ($p<0.05$, $\phi c=0.24$).

TABLE 1

|  | Lowest Yield | Middle Yield | Highest Yield |
| --- | --- | --- | --- |
| Lowest Temperature | 6 | 15 | 18 |
| Middle Temperature | 13 | 16 | 10 |
| Highest Temperature | 20 | 8 | 11 |

Hypothesis 2: Row in the Room is Related to Varietal Weight Rankings

Rationale: In experiments, rows (dimension of the grow lines) in the room had distinct flow rates and differences were observed across rows in water measurements like pH. Thus row, an imperfect proxy variable for flow rate, could have a relationship with harvest weight.

Method: The method employed in previous hypotheses was used again for this experiment, noting that row is nominal. This question investigated the location of the tower within the room so, to again pool observations across varieties, harvest weights were sorted across the room per variety as opposed to per tower, then broken into (and ranked) as being in the lowest, middle, and highest thirds for that variety. This accounts for the fact that not all varietals had the same number of capsules harvested (preventing outright paired observations), but still allowed them to be pooled. Also, not all varieties appeared in all rows of the grow space, so this experiment specifically examined only varieties appearing in the three rows that were denoted I, J, and M.

How to Read: In the contingency table, Table 2, below, three of the capsules harvested had harvest weights in the top ⅓ for their variety and came from row (grow line) I.

Similarly, 10 capsules that ranked in the middle ⅓ of harvest weights for their varietal came from row J.

Findings: The relationship between row and variety weight ranking was found to be significant ($p<0.05$, $\phi c=0.30$).

TABLE 2

|  | Lowest ⅓ of Yields | Middle ⅓ of Yields | Highest ⅓ of Yields |
| --- | --- | --- | --- |
| Row I | 15 | 10 | 5 |
| Row J | 13 | 18 | 14 |
| Row M | 4 | 4 | 13 |

Hypothesis 3: Temperature Rank in the Room is Related to Varietal Weight Rankings Rationale: While there is a vertical temperature gradient in the grow space (along the "z" axis), earlier research also found that there are also larger variable temperature gradients in the other axes as well. Since the location of the warm and cold spots vertically on a tower had a significant relationship with harvest weights, perhaps the warm and cold spots in the room more generally may also have a relationship with harvest weights as well. This hypothesis used the same sample as that used in Hypothesis 2.

Method: Using the same method employed in Hypothesis 2, the temperatures and harvest weights were sorted per variety across the room before being broken into and ranked as being in the lowest, middle, and highest thirds for that varietal.

How to Read: In Table 3 below, 16 of the capsules harvested were in the top ⅓ of harvest weights and came from the lowest ⅓ of estimated temperatures. Similarly, 15 of the capsules harvested were in the lowest ⅓ of yields but came from the highest ⅓ of estimated temperatures.

Findings: The relationship between estimated temperature rank and yield rank was found to be significant ($p<0.05$, $\phi c=0.25$).

TABLE 3

|  | Lowest ⅓ of Yields | Middle ⅓ of Yields | Highest ⅓ of Yields |
| --- | --- | --- | --- |
| Lowest ⅓ of Temperatures | 9 | 7 | 16 |
| Middle ⅓ of Temperatures | 8 | 12 | 12 |
| Highest ⅓ of Temperatures | 15 | 13 | 4 |

Determining Placement of Varieties within the Grow Space

As noted above, the experiments found significant relationships between varietal harvest weight rank and: (1) vertical temperature rank on the tower, (2) row in the room, and (3) temperature rank in the room.

These experiments helped assess the relationship between harvest weight and environmental conditions (e.g., temperature) that varied throughout the grow space 20. Conventionally, much effort is made to make environmental conditions uniform within the room. The inventors instead take advantage of the varying "picoclimates" within the grow space 20 to inform placement of varieties in optimum regions within the space.

According to embodiments of the disclosure, the engine 106 determines placement of plants within the grow space 20. According to embodiments of the disclosure, the grow space 20 includes multiple receptacle supports (e.g., towers, horizontal arms, trays, tables). A single receptacle support includes multiple receptacles. Referring to FIG. 4C, a tower-type receptacle support 50 may comprise, for example, cut-outs 105, where each cut-out 105 can hold a plug holder 158 that itself holds one or more plants of a particular variety. In general, a given receptacle support may support only plants of one variety of interest (e.g., variety for which position is optimized) or, alternatively, support plants of one variety of interest along with plants of different varieties that are not "of interest." According to embodiments of the disclosure, a single receptacle support may hold the same variety of interest (with or without other plant varieties).

According to embodiments of the disclosure, the engine 106 accesses a set of one or more reference (e.g., optimal) environmental setpoints (e.g., temperature, humidity) for each plant variety of interest in the grow space 20, where each set of reference environmental setpoints corresponds to a desired (e.g., optimal) predicted performance of the respective plant variety. For example, a particular temperature may correspond to a high harvest weight for one variety (e.g., kale), but not another (e.g., arugula).

According to embodiments of the disclosure, the engine 106 may employ an optimization algorithm (e.g., linear regression, machine learning) to predict the reference environmental setpoints for each plant variety, as described in detail below.

Predicting Optimum Harvest Weight Z Scores

According to embodiments of the disclosure, the engine 106 relies on determining the "benefit" of placing a plant of a particular variety within a region of the grow space 20 using a performance metric such as harvest weight z scores. According to embodiments of the disclosure, the engine 106 predicts the performance metric (e.g., harvest weight score) using a simple or multiple linear regression between historical values of the performance metric (e.g., harvest weight z scores) and parameters such as temperature, airflow, relative humidity or other environmental conditions, row (grow line) of the tower, position along the grow line, or a combination thereof.

According to other embodiments of the disclosure, the engine 106 may use other prediction algorithms such as decision-tree machine learning methods. Given the interaction effects between variables, the inventors focused on decision tree learning methods that are able to manage non-linear boundaries. The following were attempted:

- Single estimator CART on per-tower data
- Single estimator CART on per-plant site data
- Adaboost on per-tower data
- Adaboost on per-plant site data The dataset offered only a fairly small size given a fairly strict standard for inclusion.

- "Clean" positional records from towers that were "clean" or just had a "minimal concerns" status were used
- The towers of "minimal concern" were used in the training set given best practice but were not used in test or validation.
- Of the "clean" set, the study used 60% train, 20% test, and 20% validation set splits The study used normalized harvest weight alone as the objective function. Alternatively, the objective function may be a function of harvest weight, sensory score, capital expenditure, operating expenses, energy consumption, whether alone or in any combination thereof.

Simulation Method

The model then scored each of the possible combinations of set points (e.g., temperature, airflow, humidity), recommending the "best" or offering a range that provided "best" performance. Note that the output score represented a weighted average in proportion to the number of plants per variety expected in the space, making this method "room aware." Also, the "possible combinations" were considered to be regularly spaced discrete values within the range of each variable to be manipulated.

Validation and training set performance as measured in mean squared error ("MSE") informed the parameters of the models. Specifically, performance was used to tune depth of the estimator in the case of CART and number of estimators in the case of Adaboost (largely to combat overfitting). Therefore, while four models were studied, a number of parameters were attempted, particularly the mean squared error to determine the "best" in each class of model.

Ultimately Adaboost on the tower dataset yielded the most robust results and the validation and test MSE remained fairly similar. For completeness, Adaboost ran using SAMME.R in boosting. The estimator was a shallow decision tree as describe in scikit documentation—"Sk-learn.ensemble.AdaBoostClassifier." Scikit-Learn Documentation, Scikit, scikit-learn. org/stable/modules/generated/sklearn. ensemble. AdaBoostClassifier.html, incorporated by reference herein in its entirety.

Allocation of Plants to Locations in the Grow Space

According to embodiments of the disclosure, the engine 106 accesses measured environmental conditions (e.g., temperature, humidity) within the grow space, and determines an optimal allocation of plant varieties to respective (i.e., recommended) regions that correspond to a desired (e.g., optimal) predicted performance of the plant varieties in different volumes within the grow space, where each receptacle holds a plant of a variety of interest. According to embodiments of the disclosure, the engine 106 more finely recommends placement of a receptacle support (e.g., a tower) supporting a plant variety of interest to a position within a recommended region. For example, if the recommended region encompasses nine tower positions distributed at three positions on a first grow line 202, four positions on a second, adjacent grow line 202, and two positions on a third, adjacent grow line 202, the engine 106 may recommend assignment of three towers holding the variety of interest to the nine positions randomly, uniformly among the grow lines, or using any other known placement approach.

According to embodiments of the disclosure, the desired predicted performance may represent an optimal predicted performance, given plant and environmental constraints. For example, the engine 106 may determine an allocation of a tower 50 holding plants of a first variety of interest (e.g., kale) to a first region where the predicted performance (e.g., predicted harvest weight) of the plants of interest in the tower 50 is the highest within the grow space 20. According to embodiments of the disclosure, the engine 106 determines allocation of a tower holding plants of a second variety of interest (e.g., arugula) to a second region in the grow space 20 where the predicted performance of the second variety is optimal. However, the same tower position(s) may represent the best predicted performance for two different varieties. Thus, according to embodiments of the disclosure, the engine 106 determines allocation of varieties to tower positions based upon maximizing an overall predicted performance metric (e.g., total harvest weight) for all the varieties across all tower positions.

According to embodiments of the disclosure, the engine 106 may employ an optimization algorithm, such as a combinatorial optimization algorithm like the Hungarian algorithm, that solves the assignment problem. More details regarding the assignment problem are provided below.

According to embodiments of the disclosure, the engine 106 may display to a user via interface 104 recommendations for moving one or more receptacle supports (e.g., towers 50 holding the same variety of interest) to the determined allocated (target) region. Based on the recommendations, the user may instruct the controller 203 of the grow space control system 107 to employ robots 1502 to move such a tower 50 to a position within the recommended region. According to embodiments of the disclosure, instead of interposing a human user to operate the grow space control system 107, the engine 106 may communicate instructions directly to the controller 203 of grow space control system 107 via, e.g., an application programming interface ("API").

FIG. 7 illustrates a robot arm 1502, which may be located at an automated loading station 43, according to embodiments of the disclosure. The robot 1502 includes an end effector for releasably grasping grow towers 50. According to embodiments of the disclosure, the robot 1502 may grasp a grow tower 50 and lift it off of carriage 1202. The controller 203 may run a handshake program with a central processing controller (which may be controller 203) to check whether loading transfer conveyance mechanism 47 has an unoccupied carriage 1202 in the target region that is ready to receive a grow tower 50. The controller 203 may then instruct the robot 1502 to move and place the picked grow tower 50 onto receiver 1204 of the available carriage 1202. According to embodiments of the disclosure, A buffer track section 1522 of loading transfer conveyance mechanism 47 extends through a vertical slot in growth environment 20, allowing mechanism 47 to convey grow towers 50 attached to carriages 1202 into growth environment 20 from a stop location 1520.

According to embodiments of the disclosure, if the engine 106, the controller 203, or a combination thereof determines that the recommended region does not include an open position for a candidate tower 50, it will determine whether any incumbent towers 50 currently occupying the recommended region do not include a variety of interest that would achieve a desired predicted performance within the recommended region, and, if so, instruct the robot 1502 to remove one of the incumbent towers 50 from the recommended region and move the candidate tower 50 to the recommended region.

If the environmental conditions in the grow space 20 change, then the ideal positions for the varieties may change. Thus, according to embodiments of the disclosure, in response to a change in environmental conditions, the engine 106 may recommend a second, different allocation region for the towers 50 based on improved predicted performance (e.g., greater harvest weight, lower energy cost) of the plant varieties in the second region. According to embodiments of the disclosure, in response to these recommendations from the engine 106, the controller 203 instructs the robot 1502 to move the grow towers 50 to their new target allocation regions in a similar manner by which the towers 50 were moved to their first allocated regions.

The Assignment Problem

The inventors recognized that the allocation of varieties to grow towers may be seen as analogous to the assignment problem, a classic combinatorial optimization. In its most general form, the assignment problem sees a number of agents and a number of tasks such that any agent can be assigned to perform any task, incurring some cost that may vary depending on the agent-task assignment. Solutions to the assignment problem therefore attempt to perform all tasks by assigning exactly one agent to each task and exactly one task to each agent in such a way that the total cost of the assignment is minimized (put another way: so that the total benefit is maximized). According to embodiments of the disclosure, in an environmentally controlled farm:

The agent is the tower at a location and subject to one or more environmental condition (e.g., temperature)

The task is growing a variety at that tower.

The cost is determined by predicted variety harvest weight at the tower location, with lower costs for better (heavier) projected plant weight. As another example, instead of harvest weight, different cost metrics may be employed, such as plant price per unit weight, price per unit weight per day, or price per kw-hour. Note that this is not strictly the linear assignment problem as the target variety counts offer an additional constraint.

Optimization of Placement

This disclosure describes two methods for solving this assignment problem. According to embodiments of the disclosure, the engine 106 runs the algorithm.

The Simplex Algorithm

A traditional solution to the assignment problem is the simplex method. In this formulation, the algorithm first determines through a series of inequalities that a certain amount of each variety must be placed within the room and that each tower can contain only one variety of interest. With these constraints, each possible combination of variety of interest to tower is enumerated as an individual equation with harvest weight scores predicted using the method above. The equations are constrained so that once a variety is assigned to a tower position, it will not be considered in the set of possibilities again, thus helping reduce the optimization search space. The engine 106 then selects which combination of tower allocations to recommend for the room, optimizing the overall harvest score by maximizing the full set of equations. Unfortunately, the simplex method requires an exponentially larger number of calculations as the number of towers and varieties grow in a room. This method runs in $O(n^4)$ and was too slow in practice to feasibly place varieties in an exemplary grow room of a limited size. This is because an equation is generated per pair of tower and variety; the solution is then found with an algorithm that runs in $O(2^n)$ time.

The Hungarian Algorithm

Because the overall cost of the system is the sum of all allocations and each equation for simplex presents only a binary choice, this problem can be further reduced to the linear sum assignment problem ("LSAP") and solved using the Hungarian algorithm. According to embodiments of the disclosure, framing the problem involves representing the cost in a cost matrix having one or more rows per variety with the number of rows per variety equal to the number of towers allocated for that variety ("variety" is alternatively referred to as a "varietal" herein). In other words, there are M tasks per variety, where M is equal to the desired number of towers for a variety and each tower is an agent in the terminology of the Hungarian algorithm. As noted above, the task is growing a variety at a tower.

Note that the maximum number of tower positions assigned to a variety is constrained by the number of tower positions in the space having acceptable environmental conditions for that variety. According to embodiments of the disclosure, each tower supports only one variety of interest, although it may support other varieties for which placement is not being optimized.

The rows of the cost matrix represent the plant varieties to be assigned to tower positions (represented by columns) within the grow space. According to embodiments of the disclosure, a tower position is a position into which a tower may be placed along a particular grow line, thus representing an x-y coordinate in the grow space. According to embodiments of the disclosure, in the LSAP formulation, each column represents a tower position within the grow space and each cell represents the predicted/estimated performance (e.g., harvest weight) for a plant variety of interest located at the tower position represented by the column.

Below is a simplified example of a cost matrix:

TABLE 4

|  | Tower 1 | Tower 2 | ... | Tower n |
|---|---|---|---|---|
| Varietal 1 Tower 1 | Estimated Weight | Estimated Weight | ... | Estimated Weight |
| Varietal 1 Tower 2 | Estimated Weight | Estimated Weight | ... | Estimated Weight |
| ... | ... | ... | ... | ... |
| Varietal 2 Tower 1 | Estimated Weight | Estimated Weight | ... | Estimated Weight |
| ... | ... | ... | ... | ... |

In this example, the placement algorithm (e.g., the Hungarian algorithm) according to embodiments of the disclosure optimizes the allocation of varieties to regions within the grow space. According to embodiments of the disclosure, it is desired to assign one or more towers containing a plant variety to one or more corresponding tower positions. According to embodiments of the disclosure, the algorithm optimizes the allocation of varieties to tower positions (e.g., positions that can accept a tower) within the grow space to optimize overall performance, e.g., total harvest weight for all the towers. Each position occupies a region within the grow space. Depending upon the granularity of the environmental conditions, multiple towers may occupy a region. For example, the conditions may be the same or substantially similar within a space encompassing three tower positions. If the algorithm identifies that space as an optimum region for a particular variety, it will allocate three towers holding that variety to the region encompassing the three tower positions.

In more detail, the Hungarian algorithm of embodiments of the disclosure uses a nonnegative n×n matrix. The element in the i-th row and j-th column represents the cost of assigning the j-th task (growing a variety) to the i-th agent (tower position subject to environmental conditions). We must find an assignment of the tasks to the agents, such that each job is assigned to one agent and each agent is assigned one task, such that the total cost of assignment is minimum.

If the goal is to find the assignment that yields the maximum performance (harvest weight), the problem can be altered to fit the setting by transforming it into a cost function by using the difference: maximum theoretical harvest weight less the predicted harvest weight. Usually, the problem tackles reducing cost of assignment (e.g., assigning workers to tasks, while reducing the pay to a minimum). In our case, we want to increase the harvest weights. So we transform the problem to reducing x (to increase harvest weights), where x=maximum possible weight—predicted harvest weight.

The Hungarian algorithm uses the following theorem for polynomial runtime complexity (worst case $O(n3)$) and guaranteed optimality:

If a number is added to or subtracted from all of the entries of any one row or column of a cost matrix, then an optimal assignment for the resulting cost matrix is also an optimal assignment for the original cost matrix.

We reduce our original weight matrix to contain zeros, by using the above theorem. We try to assign tasks to agents such that each agent is doing only one task and the penalty incurred in each case is zero.

We build a n×n square matrix by appending extra columns (if needed) and setting the estimated weights in the extra columns to be the maximum value in that row.

Now we try to assign tasks to agents such that each agent is doing only one task and the penalty incurred in each case is zero.

FIGS. 13A-13B illustrate an example Hungarian algorithm below, as performed by engine 106. In this simplified example, it is desired to assign one tower to kale, one to arugula, and two to romaine, i.e., assign 25%, 25%, 50% of the multi-plant grow structures (e.g., towers) to those varieties, respectively.

1. For each row of the matrix, find the smallest element and subtract it from every element in its row. This will lead to at least one zero in that row. The result of this step is a matrix with at least one zero per row. In FIG. 13A, for example, engine 106 determines that 75 is the lowest value in the first row and subtracts that value from all elements of the first row, resulting in zero in the first row in the Tower 2 column.
2. Do the same (as step 1) for all columns, i.e., the minimum element (including zero) in each column is subtracted from all the elements in that column.
3. Determine the rows having the maximum number of zeros over all the rows, and the columns having the maximum number of zeros over all the columns. As shown by shading in FIG. 13A, the engine 106 masks the rows and columns having the determined maximum number of row zeros and column zeros, respectively, to render the masked entries inactive.
4. Test for Optimality: If the minimum count of either the masked rows or masked columns is n (e.g., 4 in this example), an optimal assignment is possible and the algorithm is finished, i.e., the engine 106 has reduced the cost matrix to optimal. Otherwise, if the minimum number of masked rows or masked columns is less than n, the engine 106 has not yet found the optimal assignment, and proceeds to step 5. This step may be represented as follows:

$K$=min_count(masked rows,masked columns);

If K equals n: stop;
Else: go to step 5.

In the example of FIGS. 13A-13B, there is one masked row and two masked columns, so neither the row count nor the column count equals 4. Thus, the algorithm proceeds to step 5.

5a: Determine the smallest entry value not in the masked row, column list (5 in this example).

5b: Subtract that value from each row not in the masked list.

5c: Add that value to each column in masked list. Return to step 3.

Referring to FIG. 13B, the engine 106 performs steps 3-5 again. This time, at step 4, the count of columns having the maximum number of zeros (2 in this example) is 4, which is equal to n. Thus, the algorithm has found the optimal placement.

Referring to FIG. 13B, the engine 106 then selects from the zero entries the positions (denoted by the column labels) at which to place the varieties (denoted by the row labels). In this example, some varieties can be placed at more than one position at minimum cost. For example, arugula (which has been allotted one tower's worth of space) can be placed at the positions of Tower 1, 2 or 3 at minimum cost, whereas the second tower's worth of romaine can only be placed at the Tower 1 position. Using known solutions to the constraint satisfaction problem, the engine 106, may assign the second tower's worth of romaine to Tower 1, and arugula to Tower 3. Overall, in this example, the engine 106 recommends placement of the varieties according to the diagonal of zeros as shown in FIG. 13B, step 4. The cost of each assignment is known from the cost matrix determined at the beginning of the algorithm, as shown at the top of FIG. 13A.

Results

Figures 11A, 11B:
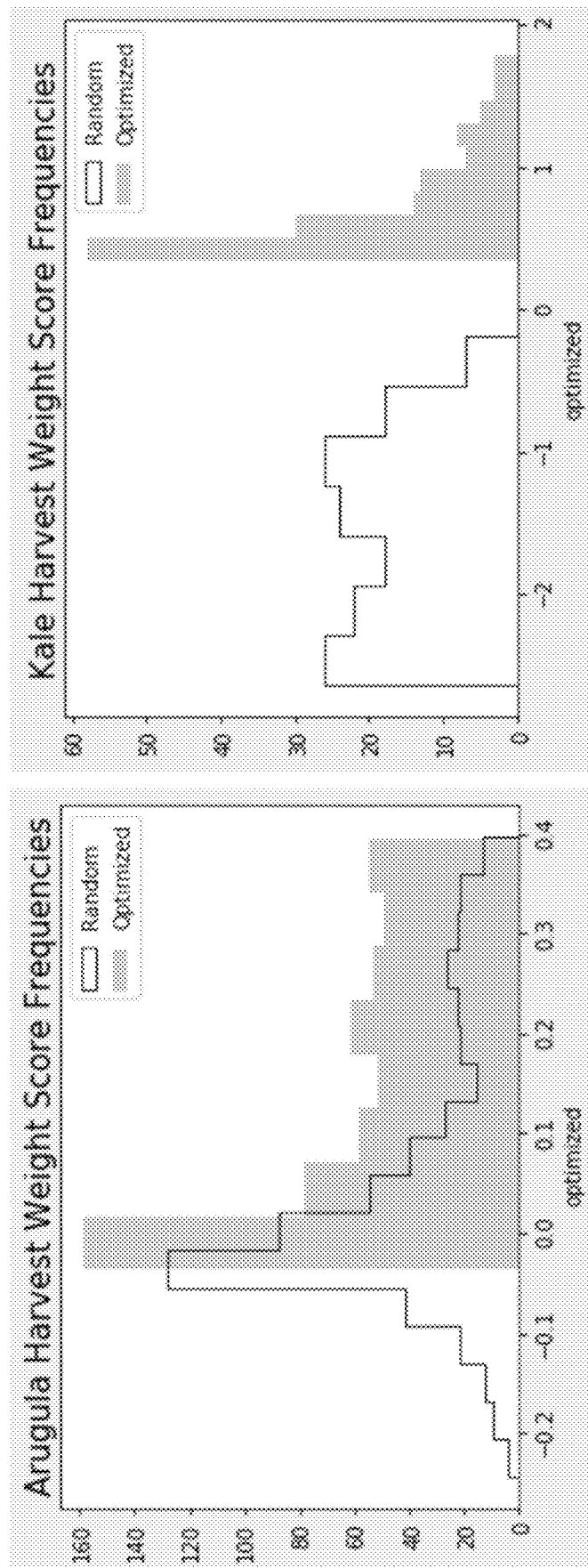
FIGS. 11A and 11B provide comparative histograms for arugula and kale weight score frequencies, respectively, showing advantages of the placement algorithm of embodiments of the disclosure.

Effectiveness was evaluated against a random solution by comparing estimated harvest weights based on random placement with estimated harvest weights based on algorithmically optimized placement according to embodiments of the disclosure that employed the Hungarian algorithm. This simulation was conducted for a grow room containing kale and arugula. FIGS. 11A and 11B each provide comparative histograms for arugula and kale weight score frequencies, respectively. In each figure, the unshaded histogram represents weight score frequencies based on random placement, whereas the shaded histogram represents weight score frequencies based on placements according to embodiments of the disclosure. In both crops, the improvement was statistically significant ($p<0.05$). The Wilcoxon Signed Rank Test was used as the data are not normally distributed but can be treated as ordinal. In accordance with earlier findings, kale has a notably improved expected harvest compared to random as it is known to be more temperature-sensitive.

The Hungarian method performs in polynomial time for a combinatorial optimization space. It is usually considered intractable to do an exhaustive search in this space for commercially practical numbers of plants and receptacle supports, e.g., towers, trays. Performing the placement computations via pen and paper would be nearly impossible or would take exponential time. There are n! ways of assigning n resources to n tasks. For 5-6 towers the number of computations is on the order of thousands. A commercial farm may use 100s of towers.

Roughly Estimating Improvement

Even though the estimates cannot be used directly, the data can still at least provide an early indication of harvest weight impact. As there is some uncertainty in extrapolation of data to unseen temperatures, one can confine the analysis just to the data ranges available. For simplification of the analysis, consider kale since there is more data available for it and it is being optimized in NARW. In the included figure, one can see that historical data is available for roughly temperatures between 24.7° C. and 25.4° C. The mean tower temperature for kale is 25.8° C. under random placement and 24.7° C. under optimized placement. If one bounds this to observed values, the analysis can use 24.7° C. for optimized placement and 25.4° C. for random placement to find that the average expected yield increases by roughly 11% (using linear regression).

Constraints of Automation

According to embodiments of the disclosure, automation may limit placement on a row-by-row basis in the case of towers moving along grow lines arranged in rows. Results from application of the Hungarian placement algorithm of embodiments of the disclosure indicate that per-row temperature fluctuations are more substantial than those within a row. Therefore, embodiments of the disclosure may constrain the algorithm and mechanical automation to row allocation but still produce yield improvements. An explanation may be that the towers of embodiments of the disclosure may act as walls or partitions within the grow space, thereby limiting the variation in environmental conditions along a grow line (row). In other words, the environmental gradient is steeper from row to row. Thus, in that case, the placement algorithm will naturally find it more significant to recommend placement of varieties from row to row to move toward to an optimum position.

Converting Liabilities to Strategic Tools

The placement algorithm according to embodiments of the disclosure converts picoclimates from a liability to an asset for multi-cropped spaces. Consider that a large open area in an indoor farm may contain multiple varieties in one area of the grow space. If no picoclimates exist, the set point may need to be decided such that a higher set point benefits warm-loving varieties to the detriment of cold-loving ones or vice versa. By taking advantage of picoclimates, both types of varieties can have a (more) ideal environment even if the set point alone would force the farmer to favor one variety over the other. The implications are potentially profound—in some instances it is perhaps not beneficial to install climate control equipment that more narrowly controls the environment or attempts to reduce the range of temperatures observed in the space as the extra cost in both capital expenditures and engineering resources may actually negatively impact yield.

Machine Learning

Embodiments of the disclosure may apply machine learning ("ML") techniques to learn the relationship between the given parameters (e.g., environmental conditions such as temperature, humidity) and observed outcomes (e.g., experimental data concerning yield and energy consumption). Embodiments may use ML models, e.g., Decision Trees, to determine feature importance. In general, machine learning may be described as the optimization of performance criteria, e.g., parameters, techniques or other features, in the performance of an informational task (such as classification or regression) using a limited number of examples of labeled data, and then performing the same task on unknown data. In supervised machine learning such as an approach employing linear regression, the machine (e.g., a computing device) learns, for example, by identifying patterns, categories, statistical relationships, or other attributes exhibited by training data. The result of the learning is then used to predict whether new data will exhibit the same patterns, categories, statistical relationships or other attributes.

Embodiments of this disclosure may employ unsupervised machine learning. Alternatively, some embodiments may employ semi-supervised machine learning, using a small amount of labeled data and a large amount of unlabeled data. Embodiments may also employ feature selection to select the subset of the most relevant features to optimize performance of the machine learning model. Depending upon the type of machine learning approach selected, as alternatives or in addition to linear regression, embodiments may employ for example, logistic regression, neural networks, support vector machines (SVMs), decision trees, hidden Markov models, Bayesian networks, Gram Schmidt, reinforcement-based learning, cluster-based learning including hierarchical clustering, genetic algorithms, and any other suitable learning machines known in the art. In particular, embodiments may employ logistic regression to provide probabilities of classification along with the classifications themselves.

Embodiments may employ graphics processing unit (GPU) or Tensor processing units (TPU) accelerated architectures that have found increasing popularity in performing machine learning tasks, particularly in the form known as deep neural networks (DNN). Embodiments of the disclosure may employ GPU-based machine learning, such as that described in GPU-Based Deep Learning Inference: A Performance and Power Analysis, NVidia Whitepaper, November 2015, Dahl, et al., which is incorporated by reference in its entirety herein.

Computer System Implementation

FIG. 12 illustrates an example of a computer system 800 that may be used to execute program code stored in a non-transitory computer readable medium (e.g., memory) in accordance with embodiments of the disclosure. The computer system includes an input/output subsystem 802, which may be used to interface with human users or other computer systems depending upon the application. The I/O subsystem 802 may include, e.g., a keyboard, mouse, graphical user interface, touchscreen, or other interfaces for input, and, e.g., an LED or other flat screen display, or other interfaces for output, including application program interfaces (APIs). Other elements of embodiments of the disclosure, such as engine 106, control system 107, and controller 203, may be implemented with a computer system like that of computer system 800.

Program code may be stored in non-transitory media such as persistent storage in secondary memory 810 or main memory 808 or both. Main memory 808 may include volatile memory such as random access memory (RAM) or non-volatile memory such as read only memory (ROM), as well as different levels of cache memory for faster access to instructions and data. Secondary memory may include persistent storage such as solid state drives, hard disk drives or optical disks. One or more processors 804 reads program code from one or more non-transitory media and executes the code to enable the computer system to accomplish the methods performed by the embodiments herein. Those skilled in the art will understand that the processor(s) may ingest source code, and interpret or compile the source code into machine code that is understandable at the hardware gate level of the processor(s) 804. The processor(s) 804 may include graphics processing units (GPUs) for handling computationally intensive tasks.

The processor(s) 804 may communicate with external networks via one or more communications interfaces 807, such as a network interface card, WiFi transceiver, etc. A bus 805 communicatively couples the I/O subsystem 802, the processor(s) 804, peripheral devices 806, communications interfaces 807, memory 808, and persistent storage 810. Embodiments of the disclosure are not limited to this representative architecture. Alternative embodiments may employ different arrangements and types of components, e.g., separate buses for input-output components and memory subsystems.

Those skilled in the art will understand that some or all of the elements of embodiments of the disclosure, and their accompanying operations, may be implemented wholly or partially by one or more computer systems including one or more processors and one or more memory systems like those of computer system 800. In particular, the elements of automated systems or devices described herein may be computer-implemented. Some elements and functionality may be implemented locally and others may be implemented in a distributed fashion over a network through different servers, e.g., in client-server fashion, for example.

Although the disclosure may not expressly disclose that some embodiments or features described herein may be combined with other embodiments or features described herein, this disclosure should be read to describe any such combinations that would be practicable by one of ordinary skill in the art. Unless otherwise indicated herein, the term "include" shall mean "include, without limitation," and the term "or" shall mean non-exclusive "or" in the manner of "and/or."

Those skilled in the art will recognize that, in some embodiments, some of the operations described herein may be performed by human implementation, or through a combination of automated and manual means. When an operation is not fully automated, appropriate components of embodiments of the disclosure may, for example, receive the results of human performance of the operations rather than generate results through its own operational capabilities.

All references, articles, publications, patents, patent publications, and patent applications cited herein are incorporated by reference in their entireties for all purposes to the extent they are not inconsistent with embodiments of the disclosure expressly described herein. However, mention of any reference, article, publication, patent, patent publication, and patent application cited herein is not, and should not be taken as an acknowledgment or any form of suggestion that they constitute valid prior art or form part of the common general knowledge in any country in the world, or that they are disclose essential matter.

SELECTED EMBODIMENTS OF THE DISCLOSURE

Each embodiment below corresponds to one or more embodiments of the disclosure. Dependencies below refer back to embodiments within the same set of embodiments.

Method Embodiments

Set M1
1. A computer-implemented method for determining placement, within a grow space, of plants of one or more varieties of a plurality of plant varieties, the method comprising:
    a. accessing, by a processor, one or more sets of one or more reference environmental setpoints, wherein each of the one or more sets corresponds to a desired predicted performance of a respective plant variety of the plurality of varieties;
    b. accessing, by a processor, environmental condition metrics at different positions within the grow space; and
    c. determining, by a processor, an allocation of the plants of the one or more plant varieties among different volumetric regions within the grow space based on predicted performance of the one or more plant varieties as a function of position within the grow space.
2. The method of embodiment 1, wherein the one or more plant varieties comprise two or more plant varieties.
3. The method of embodiment 1, wherein a region is a space encompassing one or more receptacle supports, and each receptacle support has a plurality of receptacles that each support a plant.
4. The method of embodiment 1, further comprising moving to a first region a first receptacle support supporting first plants of a first plant variety allocated to the first region.
5. The method of embodiment 1, further comprising moving to a first region a first receptacle support supporting first plants of a first plant variety allocated to the first region, wherein the first receptacle support also supports plants of another plant variety.
6. The method of embodiment 1, further comprising moving to a first region first and second receptacle supports that each support first plants of a first plant variety allocated to the first region.
7. The method of embodiment 1, wherein determining an allocation comprises determining an allocation of first plants of a first variety and second plants of a second variety to a first region and a second region, respectively, based on predicted performance of the first and second plant varieties within the grow space.
8. The method of embodiment 7, further comprising moving to the first region first plants of the first variety and moving to a second region second plants of the second variety.
9. The method of embodiment 1, further comprising, in response to a change in environmental condition metrics, determining a second allocation of the plants of the one or more plant varieties among the different regions based on predicted performance of the one or more plant varieties within the grow space.
10. The method of embodiment 9, further comprising moving from a first region to a third region a first receptacle support supporting first plants of a first plant variety that were allocated to the first region during a first allocation and then reallocated to the third region based upon the second allocation.
11. The method of embodiment 1, wherein the grow space comprises a plurality of grow towers.
12. The method of embodiment 1, wherein determining an allocation is based at least in part upon the Hungarian assignment algorithm.
13. The method of embodiment 1, wherein the one or more reference environmental setpoints correspond to at least one of temperature, relative humidity, or air flow.
14. The method of embodiment 1, wherein the predicted performance relates to at least one of growth rate, harvest weight yield, or energy cost.
15. The method of embodiment 1, wherein the environmental condition metrics are based at least in part upon sensor data.
16. The method of embodiment 1, wherein each of the one or more sets of reference environmental setpoints is determined by an optimization algorithm.
17. The method of embodiment 16, wherein the optimization algorithm uses machine learning.
18. The method of embodiment 1, wherein the grow space has a controlled agricultural environment.
19. The method of embodiment 1, wherein determining an allocation comprises maximizing overall predicted performance of the plants.

System Embodiments

Set S1
1. A system for determining placement, within a grow space, of plants of one or more varieties of a plurality of plant varieties, the system comprising:
    one or more processors; and
    one or more memories storing instructions, that when executed by at least one of the one or more processors, cause the system to:
        a. access one or more sets of one or more reference environmental setpoints, wherein each of the one or more sets corresponds to a desired predicted performance of a respective plant variety of the plurality of varieties;

b. access environmental condition metrics at different positions within the grow space; and
c. determine an allocation of the plants of the one or more plant varieties among different volumetric regions within the grow space based on predicted performance of the one or more plant varieties as a function of position within the grow space.
2. The system of embodiment 1, wherein the one or more plant varieties comprise two or more plant varieties.
3. The system of embodiment 1, wherein a region is a space encompassing one or more receptacle supports, and each receptacle support has a plurality of receptacles that each support a plant.
4. The system of embodiment 1, wherein the one or more memories store further instructions that, when executed, cause movement to a first region of a first receptacle support supporting first plants of a first plant variety allocated to the first region.
5. The system of embodiment 1, wherein the one or more memories store further instructions that, when executed, cause movement to a first region of a first receptacle support supporting first plants of a first plant variety allocated to the first region, wherein the first receptacle support also supports plants of another plant variety.
6. The system of embodiment 1, wherein the one or more memories store further instructions that, when executed, cause movement to a first region first and second receptacle supports that each support first plants of a first plant variety allocated to the first region.
7. The system of embodiment 1, wherein determining an allocation comprises determining an allocation of first plants of a first variety and second plants of a second variety to a first region and a second region, respectively, based on predicted performance of the first and second plant varieties within the grow space.
8. The system of embodiment 7, wherein the one or more memories store further instructions that, when executed, cause movement to the first region first plants of the first variety and moving to a second region second plants of the second variety.
9. The system of embodiment 1, wherein the one or more memories store further instructions that, when executed, in response to a change in environmental condition metrics, determine a second allocation of the plants of the one or more plant varieties among the different regions based on predicted performance of the one or more plant varieties within the grow space.
10. The system of embodiment 9, wherein the one or more memories store further instructions that, when executed, cause movement from a first region to a third region of a first receptacle support supporting first plants of a first plant variety that were allocated to the first region during a first allocation and then reallocated to the third region based upon the second allocation.
11. The system of embodiment 1, wherein the grow space comprises a plurality of grow towers.
12. The system of embodiment 1, wherein determining an allocation is based at least in part upon the Hungarian assignment algorithm.
13. The system of embodiment 1, wherein the one or more reference environmental setpoints correspond to at least one of temperature, relative humidity, or air flow.
14. The system of embodiment 1, wherein the predicted performance relates to at least one of growth rate, harvest weight yield, or energy cost.
15. The system of embodiment 1, wherein the environmental condition metrics are based at least in part upon sensor data.
16. The system of embodiment 1, wherein each of the one or more sets of reference environmental setpoints is determined by an optimization algorithm.
17. The system of embodiment 16, wherein the optimization algorithm uses machine learning.
18. The system of embodiment 1, wherein the grow space has a controlled agricultural environment.
19. The system of embodiment 1, wherein determining an allocation comprises maximizing overall predicted performance of the plants.

Computer-Readable Medium Embodiments

Set CRM1
1. One or more non-transitory computer-readable media storing instructions for determining placement, within a grow space, of plants of one or more varieties of a plurality of plant varieties, wherein the instructions, when executed by one or more computing devices, cause at least one of the one or more computing devices to:
a. access one or more sets of one or more reference environmental setpoints, wherein each of the one or more sets corresponds to a desired predicted performance of a respective plant variety of the plurality of varieties;
b. access environmental condition metrics at different positions within the grow space; and
c. determine an allocation of the plants of the one or more plant varieties among different volumetric regions within the grow space based on predicted performance of the one or more plant varieties as a function of position within the grow space.
2. The one or more computer-readable media of embodiment 1, wherein the one or more plant varieties comprise two or more plant varieties.
3. The one or more computer-readable media of embodiment 1, wherein a region is a space encompassing one or more receptacle supports, and each receptacle support has a plurality of receptacles that each support a plant.
4. The one or more computer-readable media of embodiment 1, storing further instructions that, when executed, cause movement to a first region of a first receptacle support supporting first plants of a first plant variety allocated to the first region.
5. The one or more computer-readable media of embodiment 1, storing further instructions that, when executed, cause movement to a first region of a first receptacle support supporting first plants of a first plant variety allocated to the first region, wherein the first receptacle support also supports plants of another plant variety.
6. The one or more computer-readable media of embodiment 1, storing further instructions that, when executed, cause movement to a first region first and second receptacle supports that each support first plants of a first plant variety allocated to the first region.
7. The one or more computer-readable media of embodiment 1, wherein determining an allocation comprises determining an allocation of first plants of a first variety and second plants of a second variety to a first region and a second region, respectively, based on predicted performance of the first and second plant varieties within the grow space.

8. The one or more computer-readable media of embodiment 7, storing further instructions that, when executed, cause movement to the first region first plants of the first variety and moving to a second region second plants of the second variety.

9. The one or more computer-readable media of embodiment 1, storing further instructions that when executed, in response to a change in environmental condition metrics, determine a second allocation of the plants of the one or more plant varieties among the different regions based on predicted performance of the one or more plant varieties within the grow space.

10. The one or more computer-readable media of embodiment 9, storing further instructions that, when executed, cause movement from a first region to a third region of a first receptacle support supporting first plants of a first plant variety that were allocated to the first region during a first allocation and then reallocated to the third region based upon the second allocation.

11. The one or more computer-readable media of embodiment 1, wherein the grow space comprises a plurality of grow towers.

12. The one or more computer-readable media of embodiment 1, wherein determining an allocation is based at least in part upon the Hungarian assignment algorithm.

13. The one or more computer-readable media of embodiment 1, wherein the one or more reference environmental setpoints correspond to at least one of temperature, relative humidity, or air flow.

14. The one or more computer-readable media of embodiment 1, wherein the predicted performance relates to at least one of growth rate, harvest weight yield, or energy cost.

15. The one or more computer-readable media of embodiment 1, wherein the environmental condition metrics are based at least in part upon sensor data.

16. The one or more computer-readable media of embodiment 1, wherein each of the one or more sets of reference environmental setpoints is determined by an optimization algorithm.

17. The one or more computer-readable media of embodiment 16, wherein the optimization algorithm uses machine learning.

18. The one or more computer-readable media of embodiment 1, wherein the grow space has a controlled agricultural environment.

19. The one or more computer-readable media of embodiment 1, wherein determining an allocation comprises maximizing overall predicted performance of the plants.

What is claimed is:

1. One or more non-transitory computer-readable media storing instructions for determining placement, within a grow space, of plants of one or more varieties of a plurality of plant varieties, wherein the instructions, when executed by one or more computing devices, cause at least one of the one or more computing devices to:
   a. access one or more sets of one or more reference environmental setpoints, wherein each of the one or more sets corresponds to a desired predicted performance of a respective plant variety of the plurality of varieties, wherein different sets of the one or more reference environmental setpoints correspond to different plant varieties;
   b. access environmental condition metrics at different positions within the grow space;
   c. determine an allocation of the plants of the one or more plant varieties among different volumetric regions within the grow space based on predicted performance of the one or more plant varieties as a function of position within the grow space; and
   d. cause removal from a first region of the different regions of a third receptacle support corresponding to third plants of a third variety before causing movement to the first region of a first receptacle support, wherein the third variety is not predicted to achieve a desired performance within the first region;
   e. based on the allocation, cause movement of the first receptacle support to the first region, the first receptacle support corresponding to first plants that are allocated to the first region, wherein the first plants belong to a first plant variety of the one or more plant varieties different from the third variety.

2. The one or more computer-readable media of claim 1, wherein the one or more plant varieties comprise two or more plant varieties.

3. The one or more computer-readable media of claim 1, wherein a region is a space encompassing one or more receptacle supports, and each receptacle support has a plurality of receptacles that each support a plant.

4. The one or more computer-readable media of claim 1, wherein each region of the different volumetric regions corresponds to a set of environmental conditions.

5. The one or more computer-readable media of claim 1, wherein the first receptacle support also supports plants of another plant variety.

6. The one or more computer-readable media of claim 1, storing further instructions that, when executed, cause movement to the first region of a second receptacle support that supports first plants of the first plant variety allocated to the first region.

7. The one or more computer-readable media of claim 1, wherein determining an allocation comprises determining an allocation of the first plants of the first variety and second plants of a second variety to the first region and a second region, respectively, based on predicted performance of the first and second plant varieties within the grow space.

8. The one or more computer-readable media of claim 7, storing further instructions that, when executed, cause movement to the second region of the second plants of the second variety.

9. The one or more computer-readable media of claim 1, storing further instructions that when executed, in response to a change in environmental condition metrics, determine a second allocation of the plants of the one or more plant varieties among the different regions based on predicted performance of the one or more plant varieties within the grow space.

10. The one or more computer-readable media of claim 9, storing further instructions that, when executed, cause movement from the first region to a third region of the first receptacle support supporting the first plants of the first plant variety that were allocated to the first region during a first allocation and then reallocated to the third region based upon the second allocation.

11. The one or more computer-readable media of claim 1, wherein the grow space comprises a plurality of grow towers.

12. The one or more computer-readable media of claim 1, wherein determining an allocation is based at least in part upon the Hungarian assignment algorithm.

13. The one or more computer-readable media of claim 1, wherein the one or more reference environmental setpoints correspond to at least one of temperature, relative humidity, or air flow.

14. The one or more computer-readable media of claim 1, wherein the predicted performance relates to at least one of growth rate, harvest weight yield, or energy cost.

15. The one or more computer-readable media of claim 1, wherein the environmental condition metrics are based at least in part upon sensor data.

16. The one or more computer-readable media of claim 1, wherein each of the one or more sets of reference environmental setpoints is determined by an optimization algorithm.

17. The one or more computer-readable media of claim 16, wherein the optimization algorithm uses machine learning.

18. The one or more computer-readable media of claim 1, wherein the grow space has a controlled agricultural environment.

19. The one or more computer-readable media of claim 1, wherein determining an allocation comprises maximizing overall predicted performance of the plants.

20. A computer-implemented method for determining placement, within a grow space, of plants of one or more varieties of a plurality of plant varieties, the method comprising:
   a. accessing, by a processor, one or more sets of one or more reference environmental setpoints, wherein each of the one or more sets corresponds to a desired predicted performance of a respective plant variety of the plurality of varieties, wherein different sets of the one or more reference environmental setpoints correspond to different plant varieties;
   b. accessing, by a processor, environmental condition metrics at different positions within the grow space; and
   c. determining, by a processor, an allocation of the plants of the one or more plant varieties among different volumetric regions within the grow space based on predicted performance of the one or more plant varieties as a function of position within the grow space,
   d. predicting that a third plant variety of the plurality of plant varieties will not achieve a desired performance within a first region of the different regions; and
   e. causing removal from the first region of a third receptacle support corresponding to third plants of the third variety before causing movement to the first region of a first receptacle support;
   wherein, based on the allocation, the first receptacle support is moved to the first region, wherein the first receptacle support corresponds to first plants that are allocated to the first region, and wherein the first plants belong to a first plant variety of the one or more plant varieties different from the third plant variety.

21. A system for determining placement, within a grow space, of plants of one or more varieties of a plurality of plant varieties, the system comprising:
   one or more memories storing instructions;
   one or more processors, operatively coupled to the one or more memories, that execute the instructions to cause the system to:
   a. access one or more sets of one or more reference environmental setpoints, wherein each of the one or more sets corresponds to a desired predicted performance of a respective plant variety of the plurality of varieties, wherein different sets of the one or more reference environmental setpoints correspond to different plant varieties;
   b. access environmental condition metrics at different positions within the grow space; and
   c. determine an allocation of the plants of the one or more plant varieties among different volumetric regions within the grow space based on predicted performance of the one or more plant varieties as a function of position within the grow space;
   d. cause removal from a first region of the different regions of a third receptacle support corresponding to third plants of a third plant variety of the plurality of plant varieties before causing movement to the first region of a first receptacle support, wherein the third variety is not predicted to achieve a desired performance within the first region; and
   e. wherein, based on the allocation, the first receptacle support is movable to the first region, wherein the first receptacle support corresponds to first plants that are allocated to the first region, and wherein the first plants belong to a first plant variety of the one or more plant varieties different from the third variety.

22. The one or more non-transitory computer-readable media of claim 1, wherein, before removal of the third receptacle support from the first region, the first region does not include an open position for accepting the first receptacle support.

23. The method of claim 20, wherein, before removal of the third receptacle support from the first region, the first region does not include an open position for accepting the first receptacle support.

24. The system of claim 21, wherein, before removal of the third receptacle support from the first region, the first region does not include an open position for accepting the first receptacle support.

* * * * *